US012568019B2

(12) United States Patent
    Sun et al.

(10) Patent No.: US 12,568,019 B2
(45) Date of Patent: Mar. 3, 2026

(54) INTELLIGENT AUTO-PROMPT ENGINE FOR NETWORK MANAGEMENT

(71) Applicant: Cisco Technology, Inc., San Jose, CA (US)

(72) Inventors: Pengfei Sun, Reno, NV (US); Eric Siyuan Liang, San Francisco, CA (US); Qihong Shao, Clyde Hill, WA (US); Elissa E. Murphy, Atherton, CA (US)

(73) Assignee: CISCO TECHNOLOGY, INC., San Jose, CA (US)

( * ) Notice: Subject to any disclaimer, the term of this patent is extended or adjusted under 35 U.S.C. 154(b) by 142 days.

(21) Appl. No.: 18/502,771

(22) Filed: Nov. 6, 2023

(65) Prior Publication Data

US 2025/0150345 A1     May 8, 2025

(51) Int. Cl.
    H04L 41/08        (2022.01)
    H04L 41/0813      (2022.01)
                         (Continued)

(52) U.S. Cl.
    CPC ...... H04L 41/0886 (2013.01); H04L 41/0813 (2013.01); H04L 41/12 (2013.01); H04L 41/16 (2013.01)

(58) Field of Classification Search
    CPC . H04L 41/0886; H04L 41/0813; H04L 41/12; H04L 41/16
    See application file for complete search history.

(56) References Cited

U.S. PATENT DOCUMENTS

| | | |
|---|---|---|
| 10,592,569 B2 | 3/2020 | Flake et al. |
| 2023/0274089 A1 | 8/2023 | Tunstall-Pedoe et al. |

(Continued)

OTHER PUBLICATIONS

Bang Y., et al., "A Multitask, Multilingual, Multimodal Evaluation of ChatGPT on Reasoning, Hallucination, and Interactivity," arXiv:2302. 04023v2 [cs.CL], Feb. 28, 2023, 52 Pages.

(Continued)

*Primary Examiner* — Tonia L Dollinger
*Assistant Examiner* — Joseph M Cousins
(74) *Attorney, Agent, or Firm* — Edell, Shapiro & Finnan, LLC

(57)        ABSTRACT

A unified prompt-based network management system that involves an intelligent auto-prompt engine generating contextualized prompts for an artificial intelligence model. The artificial intelligence model generates instructions and/or solutions and adapts to different application scenarios based on an enterprise network knowledge and reverse inference (s). Specifically, methods are provided that involve obtaining input data related to a configuration or an operation of one or more assets in an enterprise network and generating a contextualized prompt based on the input data, network knowledge information of the enterprise network, and at least one reverse inference generated using an artificial intelligence model. The methods further involve providing the contextualized prompt to the artificial intelligence model for generating a tailored response to the input data, wherein the tailored response includes a set of actionable tasks to be performed with respect to the one or more assets of the enterprise network.

20 Claims, 9 Drawing Sheets

500

(51) Int. Cl.
  *H04L 41/12* (2022.01)
  *H04L 41/16* (2022.01)

(56) References Cited

U.S. PATENT DOCUMENTS

2024/0430173 A1\* 12/2024 Coudert ................ H04W 16/18
2025/0141769 A1\* 5/2025 Li ......................... H04L 41/083

OTHER PUBLICATIONS

Chen Y., et al., "NetGPT: An AI-Native Network Architecture for Provisioning Beyond Personalized Generative Services," arXiv:2307.06148v2 [cs.LG], Jul. 23, 2023, 7 pages.

Choi J. H., et al., "ChatGPT Goes to Law School," 71 Journal of Legal Education 387, https://ssrn.com/abstract=4335905, Jan. 23, 2023, 16 pages.

Denny P., et al., "Conversing with Copilot: Exploring Prompt Engineering for Solving CS1 Problems Using Natural Language," arXiv:2210.15157v1 [cs.HC], Oct. 27, 2022, 7 Pages.

Hamadanian P., et al., "A Holistic View of AI-driven Network Incident Management," Oct. 2023, 8 Pages.

Jiao C., et al., "Network Device System Logging Summarization Based on Low-rank Adaptation and Contrastive Learning," Technical Disclosure Commons, Defensive Publications Series, Aug. 2023, 11 Pages.

Lee H., et al., "RLAIF: Scaling Reinforcement Learning from Human Feedback with AI Feedback," arXiv:2309.00267v1 [cs.CL], Sep. 1, 2023, 18 Pages.

Liu P., et al., "Pre-train, Prompt, and Predict: A Systematic Survey of Prompting Methods in Natural Language Processing," arXiv:2107.13586v1 [cs.CL], Jul. 28, 2021, 46 pages.

Mani S.K., et al., "Enhancing Network Management Using Code Generated by Large Language Models," arXiv:2308.06261v1 [cs.NI], Aug. 11, 2023, 8 pages.

Wang J., et al., "Prompt Engineering for Healthcare: Methodologies and Applications", arXiv:2304.14670v1 [cs.AI], Apr. 28, 2023, pp. 1-33.

White J., et al., "A Prompt Pattern Catalog to Enhance Prompt Engineering with ChatGPT," arXiv:2302.11382v1 [cs.SE], Feb. 21, 2023, 19 Pages.

\* cited by examiner

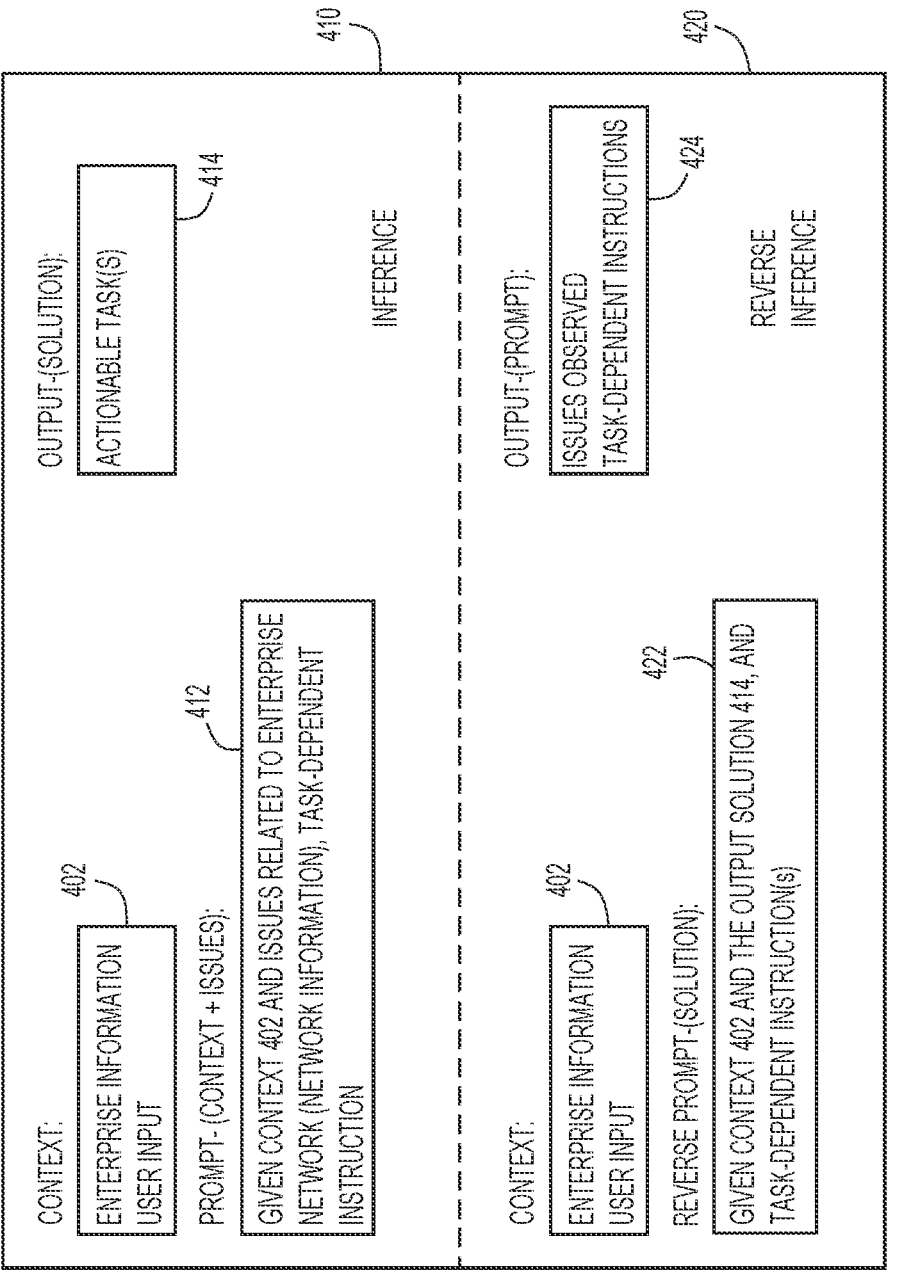

CONTEXT:

ENTERPRISE INFORMATION
USER INPUT

*402*

PROMPT- (CONTEXT + ISSUES):

*412*

GIVEN CONTEXT 402 AND ISSUES RELATED TO ENTERPRISE
NETWORK (NETWORK INFORMATION), TASK-DEPENDENT
INSTRUCTION

OUTPUT-(SOLUTION):

ACTIONABLE TASK(S)

*414*

INFERENCE

*410*

CONTEXT:

ENTERPRISE INFORMATION
USER INPUT

*402*

REVERSE PROMPT-(SOLUTION):

*422*

GIVEN CONTEXT 402 AND THE OUTPUT SOLUTION 414, AND
TASK-DEPENDENT INSTRUCTION(S)

OUTPUT-(PROMPT):

ISSUES OBSERVED
TASK-DEPENDENT INSTRUCTIONS

*424*

REVERSE
INFERENCE

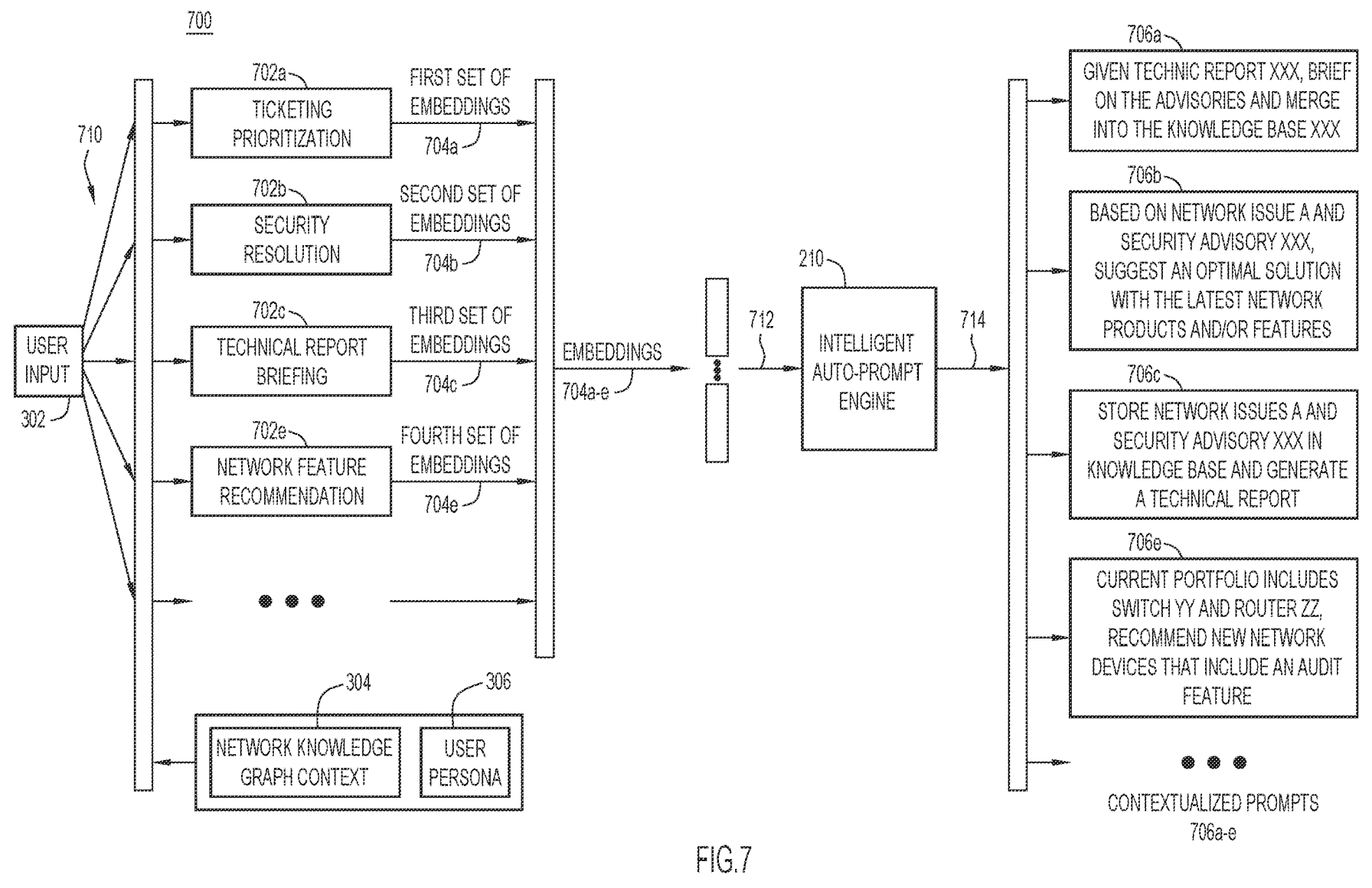

USER INPUT
302

710

TICKETING PRIORITIZATION
702a

SECURITY RESOLUTION
702b

TECHNICAL REPORT BRIEFING
702c

NETWORK FEATURE RECOMMENDATION
702e

NETWORK KNOWLEDGE GRAPH CONTEXT
304

USER PERSONA
306

FIRST SET OF EMBEDDINGS
704a

SECOND SET OF EMBEDDINGS
704b

THIRD SET OF EMBEDDINGS
704c

FOURTH SET OF EMBEDDINGS
704e

EMBEDDINGS
704a-e

712

INTELLIGENT AUTO-PROMPT ENGINE
210

714

706a
GIVEN TECHNIC REPORT XXX, BRIEF ON THE ADVISORIES AND MERGE INTO THE KNOWLEDGE BASE XXX

706b
BASED ON NETWORK ISSUE A AND SECURITY ADVISORY XXX, SUGGEST AN OPTIMAL SOLUTION WITH THE LATEST NETWORK PRODUCTS AND/OR FEATURES

706c
STORE NETWORK ISSUES A AND SECURITY ADVISORY XXX IN KNOWLEDGE BASE AND GENERATE A TECHNICAL REPORT

706e
CURRENT PORTFOLIO INCLUDES SWITCH YY AND ROUTER ZZ, RECOMMEND NEW NETWORK DEVICES THAT INCLUDE AN AUDIT FEATURE

CONTEXTUALIZED PROMPTS
706a-e

FIG.7

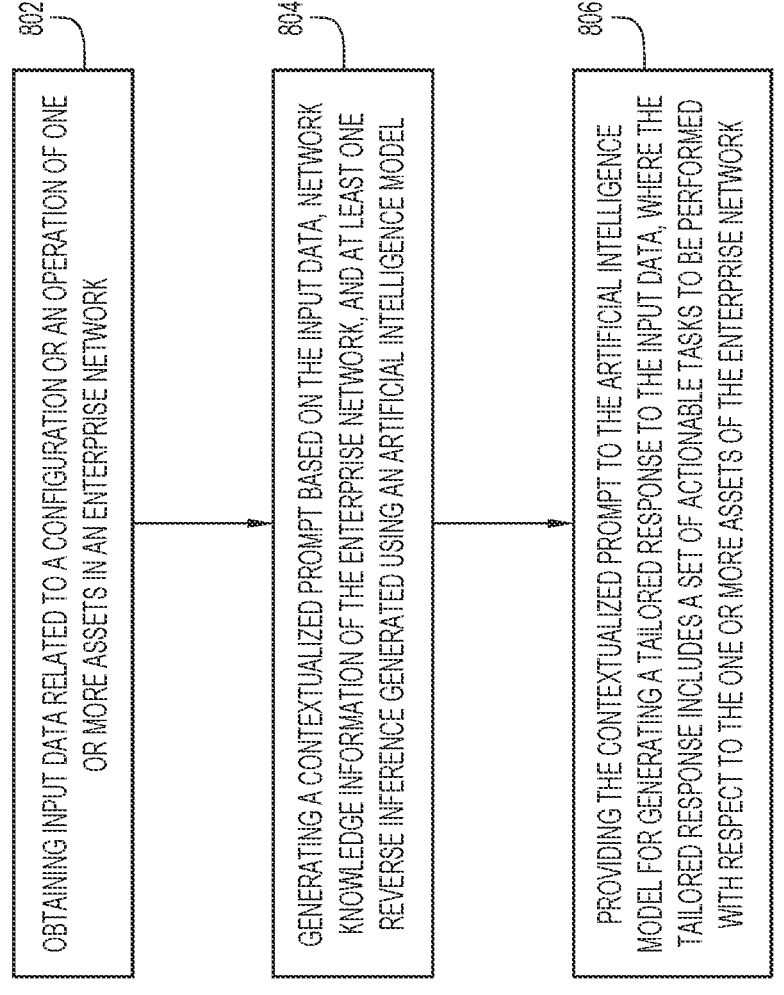

802

OBTAINING INPUT DATA RELATED TO A CONFIGURATION OR AN OPERATION OF ONE OR MORE ASSETS IN AN ENTERPRISE NETWORK

804

GENERATING A CONTEXTUALIZED PROMPT BASED ON THE INPUT DATA, NETWORK KNOWLEDGE INFORMATION OF THE ENTERPRISE NETWORK, AND AT LEAST ONE REVERSE INFERENCE GENERATED USING AN ARTIFICIAL INTELLIGENCE MODEL

806

PROVIDING THE CONTEXTUALIZED PROMPT TO THE ARTIFICIAL INTELLIGENCE MODEL FOR GENERATING A TAILORED RESPONSE TO THE INPUT DATA, WHERE THE TAILORED RESPONSE INCLUDES A SET OF ACTIONABLE TASKS TO BE PERFORMED WITH RESPECT TO THE ONE OR MORE ASSETS OF THE ENTERPRISE NETWORK

INTELLIGENT AUTO-PROMPT ENGINE FOR NETWORK MANAGEMENT

TECHNICAL FIELD

The present disclosure generally relates to computer networks and systems.

BACKGROUND

Enterprise networks include many assets and involve various enterprise service functions for equipment and software. Enterprise networks are often managed by a team of information technology (IT) specialists. This is particularly the case for enterprises that have large networks or systems of numerous instances and types of equipment and software. Tracking performance, troubleshooting, and integrating new technology and/or updates for networking or equipment and software in large enterprise networks is time consuming and often involves multiple searches of network domain knowledge.

BRIEF DESCRIPTION OF THE DRAWINGS

FIG. 4 is a view illustrating the unified prompt-based network management system of FIG. 1 generating a first solution during an inference phase and a second solution during a reverse inference phase, according to an example embodiment.

FIG. 7 is a diagram illustrating an environment in which an intelligent auto-prompt engine generates different contextualized prompts based on different network management application tasks, according to an example embodiment.

FIG. 8 is a flowchart illustrating a method of providing a contextualized prompt to an artificial intelligence model for generating a tailored response to input data, according to an example embodiment.

DETAILED DESCRIPTION OF EXAMPLE EMBODIMENTS

Overview

Figure 1:
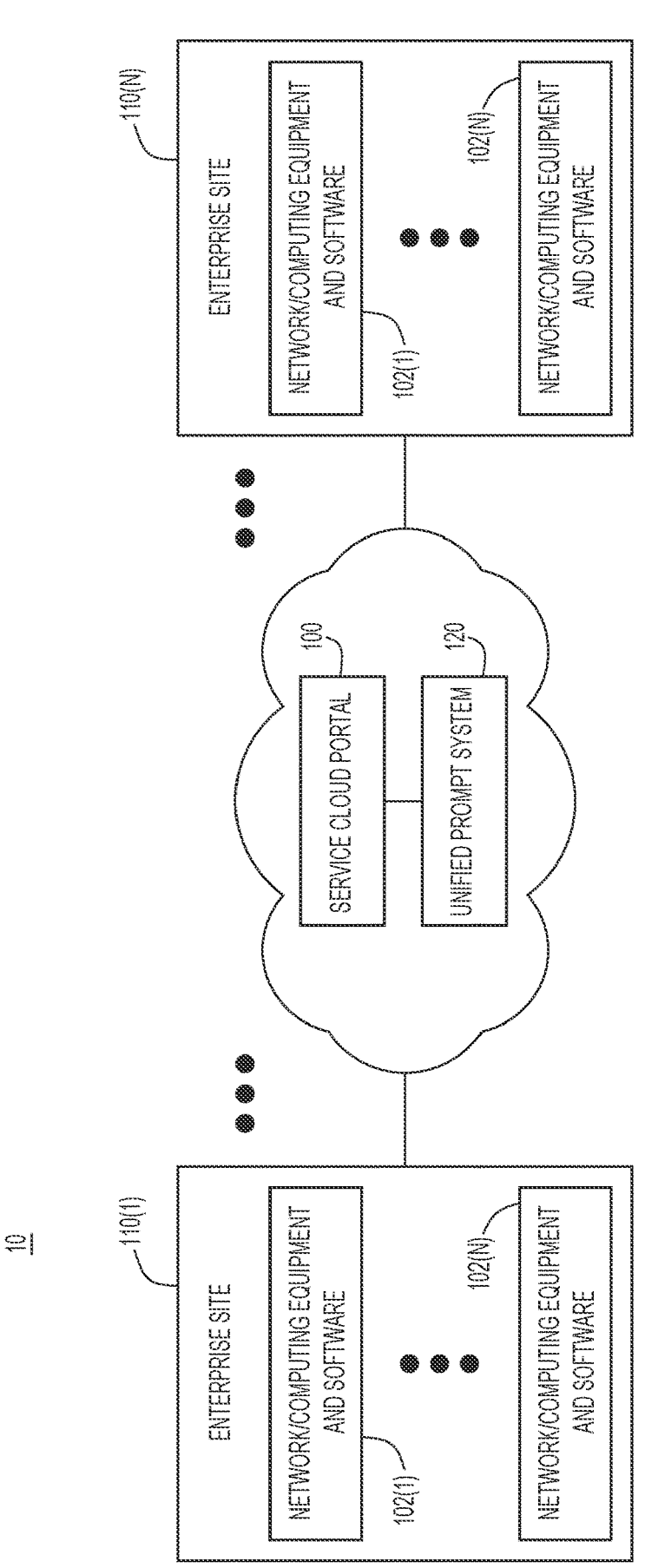
FIG. 1 is a block diagram of an environment that includes a unified prompt-based network management system that interacts with an enterprise service cloud portal and network/computing equipment and software residing at various enterprise sites of an enterprise network domain, according to an example embodiment.

Techniques presented herein provide a unified prompt-based network management system that involves an intelligent auto-prompt engine generating contextualized prompts for an artificial intelligence model. The artificial intelligence model generates instructions and/or solutions and adapts to different application scenarios based on enterprise network knowledge and reverse inference(s).

In one form, computer-implemented methods involve obtaining input data related to a configuration or an operation of one or more assets in an enterprise network and generating a contextualized prompt based on the input data, network knowledge information of the enterprise network, and at least one reverse inference generated using an artificial intelligence model. The methods further involve providing the contextualized prompt to the artificial intelligence model for generating a tailored response to the input data. The tailored response includes a set of actionable tasks to be performed with respect to the one or more assets of the enterprise network.

Example Embodiments

Network management is a desirable feature as the modern internet infrastructure has exponentially grown in the past decades. Maintaining and managing networks is labor intensive. Typically, network management involves handling large amounts of inflowing requests including but not limited to ticketing, case alarms, operational reporting, and knowledge sharing.

Recent developments in Large Language Models (LLMs) provide a unified solution for multi-task automation. The powerful LLMs demonstrate astonishing performance for natural language processing. However, performance, in part, depends on the quality of the input. Typically, input is provided in a form of a user query or instruction i.e., a prompt. The prompt may include one or more user instructions such as "translate phrase A", "write poem B", "explain model C", "generate code D," and/or "how to install patch E on network devices F". In some instances, input is guided by questions (e.g., in a form of a dialogue with a user and/or application).

It is challenging to generate effective prompts for different application scenarios. As such, a significant challenge for deploying trained LLMs to drive automation is how to generate effective prompts for different application scenarios. Employing prior knowledge into the prompt impacts effectiveness of generated outcomes. Some domain-specific prompt engineering has been developed to incorporate domain knowledge such as health care, software development, academical research, and legal consulting. However, deploying LLMs for network management automation is even more complicated and has many challenges.

First challenge may be integrating network domain knowledge into prompt context. In general, high-quality prompts may be based on domain specific contextualization because LLMs are trained on large amount of common knowledge and generate outputs toward the most frequent data samples. Since network knowledge is highly technical and includes latent correlations, the prompts should include as many network domain details as possible to modulate the LLMs for an ideal solution generation.

Second challenge may be lack of automatic prompt generation in the network domain. To accelerate a large-scale network automation pipeline, prompts used to guide the LLMs to generate solutions should be automatically generated (without relying on users, which may introduce human error). In related art, high quality prompts are based on many hours of human manual labor that thoroughly explore various options for each specific LLM, which is not suitable for scaling up network automation.

Third challenge may be lack of multi-task prompts in the network domain. The LLMs are task-agnostic and the generated output is not specific to various tasks. Users may explore solutions for different tasks and each task-dependent prompt should include specific contextualized domain knowledge but in related art, highly tailored prompts for different application scenarios cannot be generated.

In other words, in related art, input that feeds into LLMs i.e., prompt(s), is user generated or human engineered. Further, as the generalization capability on common datasets increases, the risk of LLMs hallucinating or making poor generalizations on less-frequent-distributed domain knowledge field e.g., network management, increases. Related art framework is either too focused on specialized non-network domains or is highly reliant on expert-based prompt dictionary crafting (prompt engineering). As such, it may not satisfy scaling requirements of network management automation.

The techniques presented herein, provide a unified prompt-based network management system that includes a comprehensive context-embedded automatic prompt engine i.e., an intelligent auto-prompt engine, that automatically generates contextualized prompts and is adaptable to different application scenarios (different application tasks). User and enterprise network related information and network knowledge graphs (network topology, feature information, etc.) may be deployed jointly as context embeddings to modulate the intelligent auto-prompt engine. By incorporating domain specific context (selected network domain application), the generated prompts are highly efficient in narrowing down the prompt semantic setting, which directly improves accuracy of LLM generated solutions. Further, the contextualized prompts include reverse inference(s) that help generate tailored solutions (actionable tasks) specific to input data (user input).

FIG. 1 is a block diagram of an environment 10 that includes a unified prompt-based network management system (a unified prompt system 120) that interacts with an enterprise service cloud portal (a cloud portal 100) and network/computing equipment and software 102(1)-102(N) residing at various enterprise sites 110(1)-110(N), or in cloud deployments of an enterprise, according to an example embodiment.

The notations 1, 2, 3, . . . n; a, b, c, . . . n; "a-n", "a-d", "a-f", "a-g", "a-k", "a-c", and the like illustrate that the number of elements can vary depending on a particular implementation and is not limited to the number of elements being depicted or described. Moreover, this is only examples of various components, and the number and types of components, functions, etc. may vary based on a particular deployment and use case scenario.

The environment 10 is one example of an enterprise network. The environment 10 may involve multiple enterprise networks. The network/computing equipment and software 102(1)-102(N) are resources or assets of an enterprise (the terms "assets" and "resources" are used interchangeably herein). The network/computing equipment and software 102(1)-102(N) may include any type of network devices or network nodes such as controllers, access points, gateways, switches, routers, hubs, bridges, gateways, modems, firewalls, intrusion protection devices/software, repeaters, servers, and so on. The network/computing equipment and software 102(1)-102(N) may further include endpoint or user devices such as a personal computer, laptop, tablet, and so on. The network/computing equipment and software 102(1)-102(N) may include virtual nodes such as virtual machines, containers, point of delivery (POD), and software such as system software (operating systems), firmware, security software such as firewalls, and other software products. The network/computing equipment and software 102(1)-102(N) may be in a form of software products that reside in an enterprise network and/or in one or more cloud(s). Associated with the network/computing equipment and software 102(1)-102(N) is configuration data representing various configurations, such as enabled and disabled features. The network/computing equipment and software 102(1)-102(N), located at the enterprise sites 110(1)-110(N), represent information technology (IT) environment of an enterprise.

The enterprise sites 110(1)-110(N) may be physical locations such as one or more data centers, facilities, or buildings located across geographic areas that designated to host the network/computing equipment and software 102(1)-102(N). The enterprise sites 110(1)-110(N) may further include one or more virtual data centers, which are a pool or a collection of cloud-based infrastructure resources specifically designed for enterprise intents, and/or for cloud-based service provider intent.

The network/computing equipment and software 102(1)-102(N) may send to the cloud portal 100, via telemetry techniques, data about their operational status and configurations so that the cloud portal 100 is continuously updated about the operational status, configurations, software versions, etc. of each instance of the network/computing equipment and software 102(1)-102(N) of an enterprise.

The cloud portal 100 is driven by human and digital intelligence that serves as a one-stop destination for equipment and software of an enterprise to access insights and expertise and specific to a particular stage of an adoption lifecycle. Examples of capabilities include assets and coverage, cases (errors or issues to troubleshoot), automation workbench, insights with respect to various stages of an adoption lifecycle and action plans to progress to the next stage, etc. The cloud portal 100 helps the enterprise network technologies to progress along an adoption lifecycle based on adoption telemetry and enabled through contextual learning, support content, expert resources, and analytics and insights embedded in context of the enterprise's current/future guided adoption tasks. The cloud portal 100 may store multimedia data (multiple video recordings) collected from different data sources, such as video tutorial recordings, video learning seminars, debugging or troubleshooting videos, and/or other network related videos e.g., for progressing a network technology along an adoption lifecycle or changing the configuration of one or more affected network devices.

A network technology is a computing-based service or a solution that solves an enterprise network or a computing problem or addresses a particular enterprise computing task. The network technology may be offered by a service provider to address aspects of information technology (IT). Some non-limiting examples of a network technology include access policies, security and firewall protection services, software image management, endpoint or user device protection, network segmentation and configuration, software defined network (SDN) management, data storage services, data backup services, data restoration services, voice over internet (VoIP) services, managing traffic flows, analytics services, etc. Some network technology solutions apply to virtual technologies or resources provided in a cloud or one or more data centers. The network technology solution implements a particular enterprise outcome and is often deployed on one or more of the network/computing equipment and software 102(1)-102(N).

An adoption of network technology solution refers to enterprise's uptake and utilization of a network technology for achieving a desired outcome. A journey refers to end-to-end activities performed by an enterprise when adopting a network technology including tasks they perform and defined stages to progress. An adoption lifecycle refers to a step-by-step guidance along the adoption journey to accelerate the speed to value of a network technology. The adoption lifecycle may encompass the end-to-end journey stages of: need, evaluate, select, align, purchase, onboard, implement, use, engage, adopt, optimize, recommend, advocate, accelerate, upgrade, renew, etc.

As noted above, various IT specialists (users) interact with the cloud portal 100 to manage network devices and software of the enterprise.

There are many factors for a user to consider when building, operating, and maintaining enterprise network(s) and/or data center(s). For example, an enterprise network may include dispersed and redundant sites such as the enterprise sites 110(1)-110(N) to support highly available services (e.g., network at various geographic locations). These enterprise sites 110(1)-110(N) include network/computing equipment and software 102(1)-102(N), which may be different hardware and software that host network services may be used for the enterprise services (e.g., product families, asset groups). Different types of equipment run different features and configurations to enable the enterprise services.

Moreover, each device or group of devices may encounter various issues. In one example embodiment, these issues involve network related problems or potential problems. Network related problems may involve an outage, a latency problem, a connectivity problem, a malfunction of the network device or software thereon, and/or incompatibility or configuration related problems. In one example embodiment, issues may involve defects, obsolescence, configurations, workarounds, network patches, network information, etc. Issues may relate to warranties, licenses, security vulnerabilities, or may be informational notices e.g., for a particular configuration, upgrade, or a report.

To address at least these factors, network management involves multiple different actionable tasks. For example, actionable tasks may resolve network related issues (a ticketing task), solve a security related vulnerability (security resolution task), provide technical information or asset details (technical reporting and briefing task), and/or recommend one or more network features (network feature recommendation task e.g., enable a particular feature on a group of network devices of an enterprise network). The actionable tasks may involve changing the configuration of the one or more affected network devices in the enterprise network. The configuration may be changed by establishing a connection with each of the one or more affected network devices using an application programming interface (API) and reconfiguring a hardware or a firmware on a respective network device. These are just some non-limiting examples of various actionable tasks in the network domain.

In one or more example embodiments, these actionable tasks maybe generated using an artificial intelligence (AI) model or a machine learning (ML) model. While in example embodiments described below, Large Language Models (LLMs) are deployed, this is just one non-limiting example of AI/ML models. In another example embodiment, other AI/ML models may be deployed to generate actionable tasks and train an intelligent auto-prompt engine that generates contextualized prompts. Some non-limiting examples of AI/ML models include unsupervised machine learning, supervised machine learning, deep neural networks, generative adversarial network, large language models (LLMs) such as recurrent neural networks, generative pre-trained transformers (GPT), bidirectional encoder representations from transformers (BERT), text-to-text transfer transformers (T5).

In one or more example embodiments, the environment 10 deploys the unified prompt system 120 for performing network automation. Notably, the unified prompt system 120 includes the intelligent auto-prompt engine that generates contextualized prompts for input into large language models (LLM) to generate actionable tasks/solutions/instructions that may be executed by the unified prompt system 120 and/or cloud portal 100 e.g., by establishing a connection to affected network devices and using a command line interface (CLI) to change configuration of or reconfigure the affected network devices (configuration changes may involve an operating system and/or firmware) and the connection may be established using an application programming interface.

The intelligent auto-prompt engine is a multi-task actor configured to generate different network domain-dependent prompts for incorporating specialized network domain knowledge. The intelligent auto-prompt engine is trained using a reverse prompt generation module. Moreover, user profiles and network asset information (e.g., enterprise network inventory) are also employed in prompt contextualization. By using deep customization in prompt generation, the unified prompt system 120 generates specific, tailored solutions/actionable tasks in network automation. The intelligent auto-prompt engine may automatically generate prompts and adapt to different application scenarios (application tasks). User and network knowledge graphs are deployed jointly as context embeddings to modulate the intelligent auto-prompt engine. By incorporating the domain specific context, the generated prompts are highly efficient in narrowing down the prompt semantic setting, which directly maximize the accuracy of LLM generated solutions i.e., actionable tasks generated by the LLM of the unified prompt system 120.

In one or more example embodiments, the intelligent auto-prompt engine automatically generates prompts for an LLM based on network domain knowledge i.e., network knowledge information. The network domain knowledge includes network configuration information, network topology information, operations related data or telemetry data and/or a particular network issue that is being resolved. The intelligent auto-prompt engine generates different contextualized prompts for different types of use cases. As such, the contextualized prompts are specifically tailored to the enterprise network, the user, and the task at hand (e.g., security patch, configuration change, etc.).

User information may involve user persona, user identity, and/or user network persona within an enterprise network and includes user's role(s) within the enterprise network i.e., tasks or activities that the user is to perform for the enterprise network. The user persona may be determined based on a user profile within each enterprise network and/or user's click-through history (activities of the user within each enterprise network). User persona may be determined in various ways such as embedding a user profile, user role within an enterprise network, and/or user click through history and applying neural networks or other machine learning/artificial intelligence models.

By way of a non-limiting example, a user persona may be a protector, an operator, a decider, a researcher, a planner, or a developer. The operator may focus on asset management such as status and performance of the network equipment and software 102(1)-102(N), whereas the planner may focus on an overall performance of the enterprise network (whether the enterprise has enough resources/assets to serve the operations, etc.).

User persona may further be based on different daily tasks performed by the user depending on the type, size, and job segmentation of their enterprise. For example, the operator may have a network role that focuses on hardware assets of the enterprise or may have a security role that focuses on operating system versions of the enterprise assets. The user persona may thus account for different jobs performed by the user. The user persona may further be different for different enterprises. For example, the planner may focus on enterprise network's reliability and stability for enterprise A while focusing on increasing the present network workload for enterprise B. That is, the user persona may account for different tasks performed by the user for different enterprises.

Moreover, the user persona may further include skill level of the user. A user with the same role may have a different level of expertise or experience. For example, a network operator with ten years of experience and long activity history with the enterprise network has a different user persona than a network operator that is working less than year with the enterprise network and has a short activity history.

Based on different user personas, the intelligent auto-prompt engine generates different contextualized prompts that are individually tailored to the user (i.e., user persona). By using the user persona, the generated prompts are tailored to satisfy conditions for specific tasks targeting on a certain user role. The LLM of the unified prompt system 120 thus generates a more targeted actionable tasks i.e., provides a more efficient and targeted way to solve a network problem and/or learn or perform a particular actionable task for configuring or reconfiguring asset(s) in an enterprise network.

In one or more example embodiments, actionable tasks are instructions for configuring, reconfiguring, and/or operating an enterprise network and/or one or more of network devices (enterprise assets) therein including establishing a connection to a respective device. Each actionable task may include one or more operations/computer-executable instructions/actions that may result in changes to the firmware. At least some of the actions may be performed by the cloud portal 100 such as changing a configuration of or reconfiguring a particular network device(s), updating software asset(s) to a newer version, changing firmware, etc. The user is then notified that these automated actions were performed. The intelligent auto-prompt engine may generate a contextualized prompt based on which, the LLM generates a set of tasks for performing action(s) on a group of devices. For example, actions may involve running a particular service of the enterprise, using a particular network technology, enabling one or more configuration features on affected group of network devices by establishing a connection with these network devices, automatically installing the same security patch for a first network/computing equipment and software 102(1) and a second network/computing equipment 102(N), where the first network/computing equipment and software 102(1) and the second network/computing equipment and software 102(N) are similarly functioning devices located at different enterprise sites.

While one or more example embodiments describe actionable tasks for performing one or more actions associated with the enterprise network using the cloud portal 100, this is just an example. Actionable tasks may involve other services and/or systems. Actionable tasks may or may not involve the cloud portal 100.

In one example embodiment, actionable tasks may include a first action that involves a network management platform for a first enterprise site 110(1), a second action that involves a network controller of the network domain, and a third action that involves establishing a direct connection to one of the network/computing equipment and software 102(1)-(N) at a second enterprise site 110(N). Actionable tasks may include actions that are performed in multiple management platforms and the like.

Figure 2:
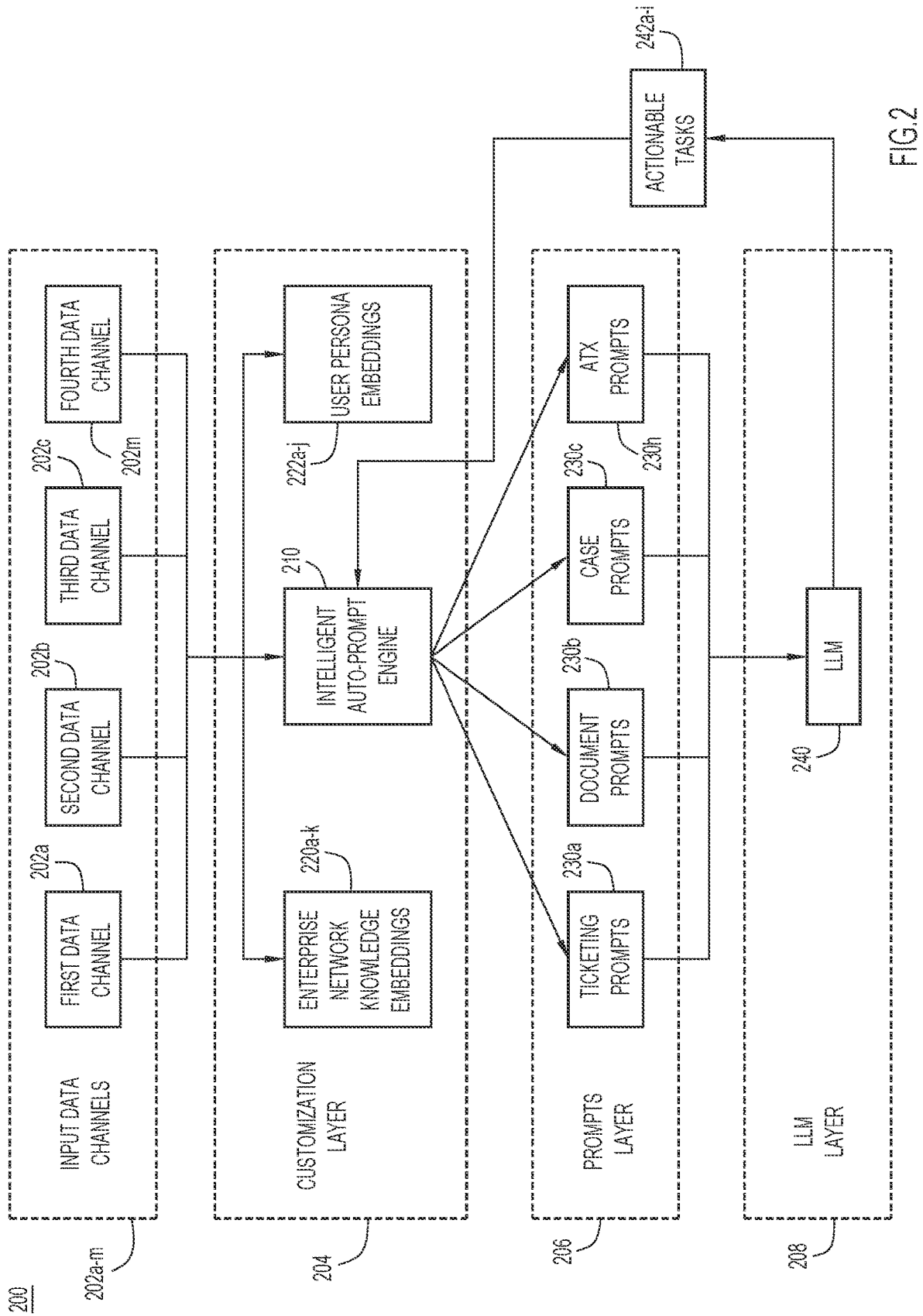
FIG. 2 is a diagram illustrating a network automation pipeline of the unified prompt-based network management system of FIG. 1 that generates actionable tasks, according to an example embodiment.

With continued reference to FIG. 1, FIG. 2 is a diagram illustrating a network automation pipeline 200 of the unified prompt system 120 of FIG. 1 that generates actionable tasks, according to an example embodiment. The network automation pipeline 200 includes an input data channels 202a-m, a customization layer 204, a prompt layer 206, and an LLM layer 208 that generates actionable tasks 242a-i. Notably, the network automation pipeline 200 involves an intelligent auto-prompt engine 210 that generates contextualized prompts.

The input data channels 202a-m are sources of user input. The sources may be a cloud-based service, a particular user application, a network device, an application task in the cloud portal 100 of FIG. 1, etc. User input may include user queries, user requests or instructions, one or more documents, telemetry data from a network device, etc. In one example embodiment, the input data channels 202a-m may include the cloud portal 100 of FIG. 1 that has a user interface for obtaining user input. However, the cloud portal 100 may itself generate input data e.g., provide a security alert to the intelligent auto-prompt engine 210 for generating applicable security patches by the LLM. In other words, user input may include data from a service application.

In another example embodiment, the input data channels 202a-m may include a first data channel 202a such as a ticketing application or ticketing tool that creates, tracks, and catalogues IT service requests, a second data channel 202b such as a cloud-based IT document management application that stores, organizes, and shares network related information for one or more enterprises, a third data channel 202c such as a security related application that manages security related issues and vulnerabilities in enterprise networks, and a fourth data channel 202m such as a cloud-based network management platform that manages one or more assets of an enterprise network including enabled features, asset licensing, managing lifecycles of network technologies in an enterprise network, etc.

The customization layer 204 involves contextualizing input data based on enterprise network knowledge data and/or user persona/profile data. The customization layer 204 involves enterprise network knowledge embeddings 220a-k and user persona embeddings 222a-j. The enterprise network knowledge embeddings 220a-k may include an enterprise network topology embedding, network features and network devices or asset embeddings, operational data embeddings, configuration data embeddings, etc. The user persona embeddings 222a-j may include a user profile embedding, user skill level embedding, user role embedding (user persona within the enterprise network), etc. The enterprise network knowledge embeddings 220a-k and user persona embeddings 222a-j are input into the intelligent auto-prompt engine 210, which contextualizes input data based on these embeddings to generate a contextualized, specifically tailored prompt.

For example, the intelligent auto-prompt engine 210 obtains user input or input data (e.g., query, questions, instructions, and requests) and contextualizes the input, for example, based on user profile, asset profile, and network knowledge graph (features, assets, operational data of the enterprise) to generate a contextualized prompt specifically tailored to the user and the enterprise network. That is, a set of nodes that match the input are extracted from the network knowledge graph.

Further, the intelligent auto-prompt engine 210 is trained using different use cases and scenarios. Accordingly, in the prompt layer 206, the intelligent auto-prompt engine 210 is further configured to contextualize the prompt based on a particular use case scenario selected from a plurality of downstream applications. For example, the downstream applications may include ticketing, network document management, secure related management systems, application transaction expert systems (ATX), etc.

The intelligent auto-prompt engine 210 is uniformly applied to multiple downstream tasks i.e., the task-agnostic prompt engine is used for multiple downstream tasks, to generate prompts specifically tailored to a selected downstream application. For instance, if the intelligent auto-prompt engine 210 is applied for ticketing management system, the generated prompts directly provide solutions or filter out false alarms.

The intelligent auto-prompt engine 210 further automatically generates different task-dependent prompts 230a-h to establish a knowledge base tailored to users' tasks. In one example, the intelligent auto-prompt engine 210 generates ticketing prompts 230a when the downstream application is a ticketing system, document prompts 230b when the downstream application is an automatic knowledge base maintenance, case prompts 230c when the downstream application is enterprise network security management, and atx prompts 230h when the downstream application is application transaction expert.

Lastly, the generated contextualized prompt (i.e., different task-dependent prompts 230a-h) is consumed by the LLM 240 of the LLM layer 208. Some non-limiting examples of the LLM 240 are ChatGPTs, BERT models, and LaMDA models. The LLM 240 generates a solution that may include actionable tasks 242a-i. The actionable tasks 242a-i are fed back into the intelligent auto-prompt engine 210 to improve accuracy (further train the intelligent auto-prompt engine 210). In other words, the intelligent auto-prompt engine 210 is continuously trained via a feedback loop to improve accuracy of generated contextual prompts, which in turn improves the actionable tasks 242a-i.

In one or more example embodiments, the intelligent auto-prompt engine 210 automatically generates contextualized prompts for various downstream tasks further based on reverse inferences. Specifically, the intelligent auto-prompt engine 210 reversely generates prompt ground truth, which may further be jointly combined with user/network context for training the intelligent auto-prompt engine 210. That is, the contextualized prompts are generated based on reverse inferences (e.g., previously suggested solutions). Further, the network knowledge and user settings are integrated into the intelligent auto-prompt engine 210. The network knowledge base and user profile are used to modulate the intelligent auto-prompt engine 210, which allows the generated contextualized prompts to have tailored customization and more comprehensive consideration of the network domain knowledge.

Moreover, the intelligent auto-prompt engine 210 is configured to perform multi-task automatic prompt generation. That is, in the ground truth generation framework, the data of different downstream tasks are transformed into embeddings, which, jointly with the corresponding prompts (generated by LLMs), further train the intelligent auto-prompt engine 210. As such, the intelligent auto-prompt engine 210 itself learns to output different application scenario-based prompts. Training data is enabled to cover different application scenarios such as network security, inventory planning, software upgrading, etc. When the intelligent auto-prompt engine 210 is trained, the intelligent auto-prompt engine 210 learns to automatically adapt the output contextualized prompt to the selected input network domain task/application/scenario. That is, the intelligent auto-prompt engine 210 is trained to be uniformly applied to multiple downstream tasks. In other words, the task-agnostic prompt engine is configured to generate multiple different downstream tasks (actionable tasks 242a-i) depending on the use case scenario. The intelligent auto-prompt engine 210 automatically generates different task-dependent contextual prompts to establish a knowledge base tailored to user's current tasks.

Figure 3:
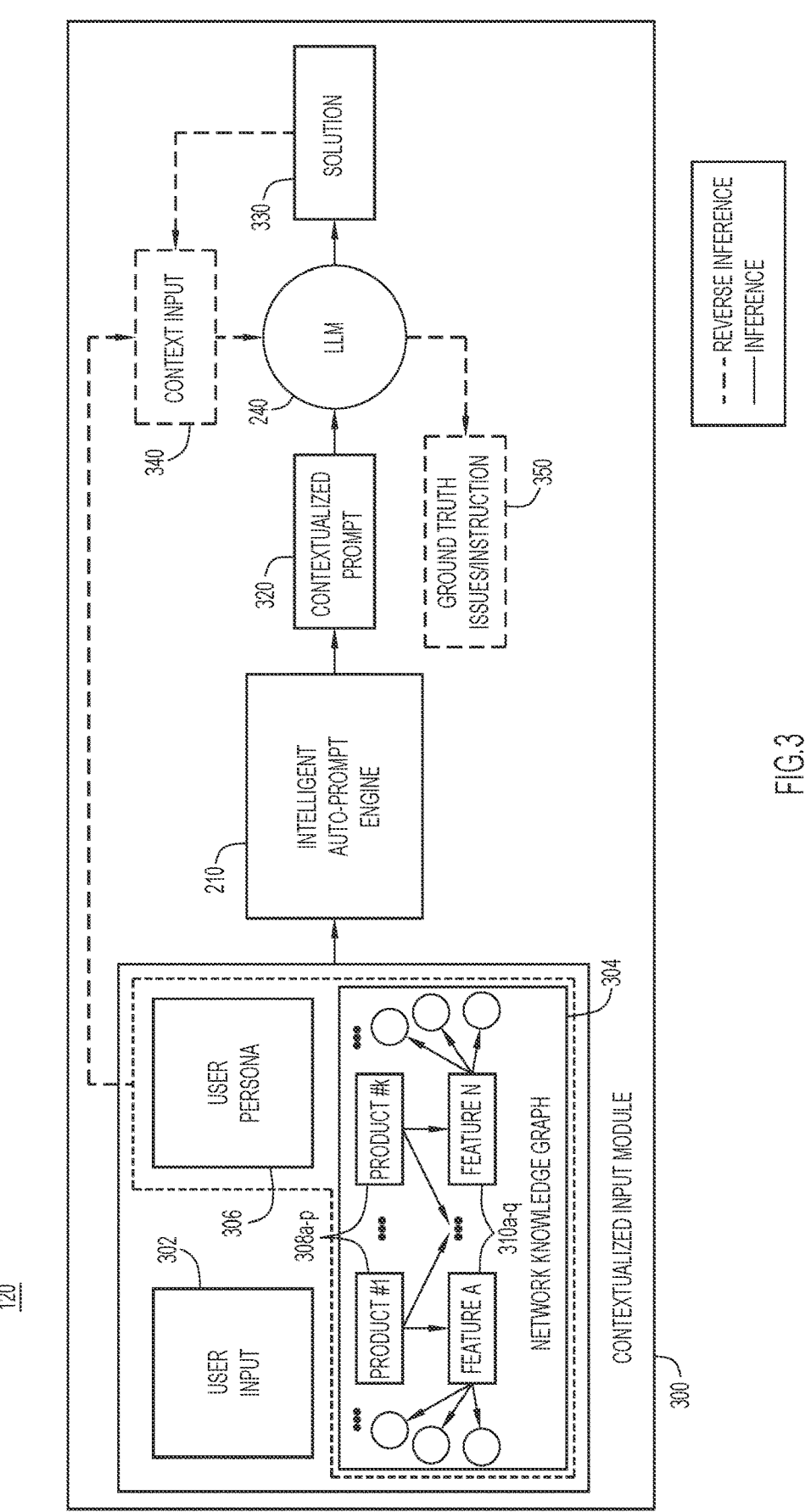
FIG. 3 is a block diagram illustrating components of the unified prompt-based network management system of FIG. 1, according to an example embodiment.

With continued reference to FIGS. 1 and 2, FIG. 3 is a block diagram illustrating components of the unified prompt system 120 of FIG. 1, according to an example embodiment. The unified prompt system 120 includes a contextualized input module 300, the intelligent auto-prompt engine 210 and the LLM 240 of FIG. 2.

The contextualized input module 300 obtains input data that includes user input 302, network knowledge graph 304, and user persona 306.

The user input 302 or input data includes input from a user and/or input generated by a service application e.g., a ticketing application. For example, the user input 302 may include user queries or questions (e.g., how to fix bug A on a device type B). As another example, the user input 302 may include user requests or instructions (e.g., generate a fix for a security vulnerability X). The user input 302 may include document(s) and/or other information.

The network knowledge graph 304 is generated based on network knowledge information about the enterprise network. The network knowledge graph 304 may include the topology of the enterprise network, data related a plurality of network features, asset inventory of the enterprise network, and/or telemetry data about operation or configuration of the network devices or enterprise assets. In one example embodiment, the network knowledge graph 304 includes a plurality of products 308a-p (i.e., enterprise assets that include network devices such as routers, switches, servers, etc.) and a plurality of features 310a-q that are being executed on various enterprise assets. Additionally, the network knowledge graph 304 may further include various configurations for the plurality of features 310a-q (enabled/disabled, etc.).

The user persona 306 may be in a form of a user information graph. The user persona 306 may include a user profile, experience level, role in the enterprise, knowledge domain, etc. In one example embodiment, the user persona 306 may further involve profile and network domain of an enterprise e.g., large enterprise network versus small enterprise network, other attributes of the enterprise network as it relates to the user and user's role in the enterprise network.

The contextualized input module 300 contextualizes the user input 302 based on the network knowledge graph 304 and the user persona 306. Specifically, the contextualized input module 300 generates enterprise network embeddings based on the network knowledge graph 304. The contextualized input module 300 may extract a set of nodes from multiple nodes of the network knowledge graph 304 based on the user input 302 and may generate a network knowledge vector based on the extracted set of nodes. The contextualized input module 300 further contextualizes the user input 302 based on the user persona 306. Specifically, the contextualized input module 300 generates user embeddings based on user profile(s), user role(s) within the enterprise network, attributes of the enterprise network (e.g., number and type of network devices, etc.).

Next, the user input 302 together with the network knowledge graph 304 and the user persona 306 are fed into the intelligent auto-prompt engine 210. The intelligent auto-prompt engine 210 generates an optimal prompt i.e., a contextualized prompt 320. That is, the contextualized prompt 320 is generated by processing the user input 302 based on the network knowledge vector/network knowledge embeddings and user embeddings. The intelligent auto-prompt engine 210 may be a neural network that consumes as an input layer various embeddings and/or vectors along with the user input 302 and outputs the contextualized prompt 320. In other example embodiments, the intelligent auto-prompt engine 210 may be other statistic models such as n-gram model, exponential model, or skip gram model.

Next, the contextualized prompt 320 is consumed by the LLM 240 to elicit the solution 330 i.e., one or more actionable tasks.

In one or more example embodiments, the unified prompt system 120 is further configured to provide a reverse inference framework for prompt ground truth generation i.e., to generate one or more reverse inferences. Specifically, during training, the LLM 240 is deployed to generate prompts, referred to as a ground truth issues/instruction 350 when using the already-known solutions as the input prompts i.e., the solution 330. The network knowledge graph 304 and the user persona 306 may be incorporated with the solution 330 to form context input 340. Based on the foregoing, the ground truth issues/instruction 350 is generated. The ground truth issues/instruction 350 is indicative of an optimal prompt to obtain the solution 330. Using the reverse inference (the ground truth issues/instruction 350), optimal solution is generated by the LLM 240 during deployment.

The unified prompt system 120 is deployed to generate the inferences i.e., the solution 330 and to generate reverse inferences i.e., the ground truth issues/instruction 350 (optimal prompts).

Further, in one or more example embodiments, the unified prompt system 120 generates contextualized prompts i.e., the contextualized prompt 320 (for the inference) and the context input 340 (for the reverse inference). The unified prompt system 120 utilizes both the network knowledge graph 304 and the user persona 306 to contextualize the user input 302 (in an inference phase) and to contextualize the solution 330 (in a reverse inference phase). For example, the user input 302 is parsed and the graph search is leveraged to match knowledge graph nodes of the network knowledge graph 304. The localized network knowledge graph nodes are then transformed into embeddings to represent the global context for the user input 302 and/or the solution 330.

Additionally, in one or more example embodiments, the unified prompt system 120 is trained for multi-task prompt generation. That is, the unified prompt system 120 generates different contextualized prompts for different use case scenarios i.e., network domain applications. Specifically, training data for the unified prompt system 120 is enabled to cover different application scenarios such as network security, inventory planning, software upgrading, etc. In this way, the trained network management system (i.e., the intelligent auto-prompt engine 210) automatically adapts the output contextualized prompt to the corresponding input network domain (i.e., network management application).

With continued reference to FIGS. 1-3, FIG. 4 is a view 400 illustrating the unified prompt system 120 generating a first solution during an inference phase 410 and a second solution during a reverse inference phase 420, according to an example embodiment. The first solution may be actionable tasks (the solution 330 of FIG. 3) and the second solution may be the prompts (the ground truth issues/instruction 350 of FIG. 3). The first and second solutions are generated using context 402.

The context 402 may include enterprise information and user input. Enterprise information may include attributes of the user and the enterprise (i.e., the user persona 306 of FIG. 3). For example, the attributes of the enterprise may be a type of enterprise, the size of the enterprise, etc. (e.g., a financial institution (bank) that has a predetermined number of users (1,000 employees)). The user input is the user input 302 of FIG. 3. For example, the user input may be firewall is approaching end of life, the hardening score is low. In this example, the user may be looking for actionable tasks to improve the security of the enterprise network (e.g., security patch, new firewall, etc.).

In the inference phase 410, the prompt 412 includes the context 402, issues or observations related to the enterprise network i.e., information from the network knowledge graph 304 of FIG. 3 and task-dependent instruction(s). For example, the prompt 412 is "given the context 402, the network system log shows significant increase in indicator of compromise (IOC) reports (information from the network knowledge graph 304), how can the IOC issues be reduced (task-dependent instruction that may be input by a user or requested by a ticketing application, for example)?". The LLM 240 of FIGS. 2 and 3 then generates the first solution that includes actionable tasks to reduce the IOC issues such as an output solution 414. For example, the output solution 414 may be "upgrade the security configuration on enterprise network devices yyyy and change the firewall policy to xxxxx".

In the reverse inference phase 420, the output solution 414 is combined with the context 402 as a new prompt (a reverse prompt 422) to generate an output prompt 424. For example, the reverse prompt 422 is "given the context 402 and the recommended solution of a first actionable task to upgrade the security configuration on enterprise network devices yyyy and a second actionable task to change the firewall policy to xxxxx, what are possible issues?" Accordingly, the LLM 240 generates the output prompt 424, which maps back to the prompt 412. For example, the output prompt 424 may be that the network system shows an increase in IOC reports (i.e., issues observed) and the goal is to reduce the IOC issues (i.e., task-dependent instructions). As such, the prompt ground truth is directly and automatically generated instead of being limited by human-crafted prompt labels. By including one or more reverse inference(s) in the contextualized prompt provided to the LLM 240, the LLM 240 is then configured to generate actionable tasks that are specific to the enterprise network and the task at hand.

With continued reference to FIGS. 1-4, FIG. 5 is a diagram illustrating a reverse inference framework 500 in which the LLM 240 generates reverse inferences for the intelligent auto-prompt engine 210, according to an example embodiment. The reverse inference framework 500 uses an expert feedback 502 to generate a prompt ground truth (a ground truth solution 504) that are then used for generating reverse prompts 506. In the reverse inference framework 500, the LLM 240 automatically generates a prompt ground truth issue/instructions 508 for the prompt engine training.

The expert feedback 502 may involve one or more actionable tasks generated and/or performed by IT experts. The expert feedback 502 provides solutions to various network issues such as run updates, reconfigure network devices, install security patches, etc.

For example, the solution may be upgrading a security configuration on network routers XXX in the enterprise network. The user input 302 together with expert feedback 502 forms the ground truth solution 504. The ground truth solution 504 are actionable tasks such as generating a named attribute map for a particular attribute using one or more commands (configure attribute map and add attribute map to a server configuration file).

As another example, the ground truth solution 504 may be several system commands such as (1) get into active Linux shell, (2) execute inventory command (cd/network devices/inventory), (3) delete issue card's inventory file, and (4) insert a standby card into the inventory. This ground truth solution 504 replaces a faulty interface or network card.

As yet another example, the ground truth solution 504 may be commands to update a signature package for a network router to a different version to avoid crashes in the network device (a workaround for an upgrade that is causing a network router to crash). The actionable tasks are (1) update the signature package to anything less than version X and (2) if already updated with any package larger than or equal to version X, follow the below steps to disable an intrusion prevention system (IPS) in the enterprise network:

Access the router via a client console (e.g., use command line interface (CLI) commands)

Enter break sequence to access a bootstrap program.

Change the config-register value to yyyy.

Boot the router to bypass the startup-configuration.

Configure the basic IP parameters.

Use Trivial File Transfer Protocol (TFTP) to update modified configuration to the router's running-configuration with operating system IPS disabled.

Reset the config-register to zzzz.

Enter write memory and reload.

Generally, the LLM 240 consumes prompts and output solutions. In the reverse inference framework 500, the ground truth solutions (actionable tasks) together with context 510 (such as network knowledge graph 304 and the user persona 306 of FIG. 3) are utilized to formalize the reverse prompts 506. The reverse prompts 506 are passed into the LLM 240, and accordingly the LLM 240 generates the ground truth of the original prompt i.e., the ground truth issue/instructions 508. Using the ground truth issue/instructions 508, the context 510, and task dependent instructions 512 (detailed in FIG. 7), the contextualized prompt 514 is generated.

With continued reference to FIGS. 1-5, FIG. 6 is a diagram illustrating an environment 600 in which the intelligent auto-prompt engine 210 of FIGS. 2-3 generates a contextualized prompt, according to an example embodiment.

In the contextualization prompt generation, the user persona 306 (user profile) and the network knowledge graph 304 are used to contextualize the user input 302 (e.g., query, question, instruction, or request). Specifically, the user input 302 is parsed into keywords. The keywords are then fed into the network knowledge graph 304 for graph searching, shown at 602. Specifically, the parsed keywords are being compared to nodes in the network knowledge graph 304. By matching the parsed keywords and the network knowledge graph nodes, the most similar nodes and their attributes are extracted and transformed into embedding vectors 604*a-d*. In other words, a set of nodes is extracted from the network knowledge graph 304 based on the user input 302 and one or more network knowledge vectors (the embedding vectors 604*a-d*) are generated. In one example embodiment, the network knowledge information includes a topology of the enterprise network and data related to a plurality of network features of a plurality of assets in the enterprise network such that enterprise network embeddings (the embedding vectors 604*a-d*) are generated and are matched network knowledge subgraph that is formalized into the embedding vectors 604*a-d* (the enterprise network embeddings).

Additionally, the user persona 306 is vectorized or processed into user embedding(s) 606*a-c* using a neural network, for example. That is, user embedding(s) 606*a-c* are generated based on the user persona 306 which may include user profile(s), user role(s) within the enterprise network, user past activities, and enterprise network information (size, number of users, number of network devices, etc.).

Moreover, the user input 302 is processed into input data embedding(s) 608*a-b* using a neural network, for example. As such, all three components (user input 302, user persona 306, and network knowledge graph 304) are formalized into vectors. That is, the enterprise network embeddings 604*a-d* (matched network knowledge subgraph(s)), the user embeddings 606*a-c* (user profile), and input data embeddings 608*a-b* (user input) are passed through the intelligent auto-prompt engine 210, at 610. At 612, the intelligent auto-prompt engine 210 generates a contextualized prompt 614. The contextualized prompt 614 includes context, enterprise and user information, user query/instruction, and reverse inference(s).

With continued reference to FIGS. 1-6, FIG. 7 is a diagram illustrating an environment 700 in which the intelligent auto-prompt engine 210 of FIGS. 2 and 3 generates different contextualized prompts based on different application tasks, according to an example embodiment. In addition to the user input 302, the network knowledge graph 304, and the user persona 306, network domain specific application scenario is fed into the intelligent auto-prompt engine 210 to generate contextualized prompts 706*a-e* that are specific to the task at hand.

One challenge for existing prompt generation mechanisms is achieving a multi-task prompt generator. In one or more example embodiments, the intelligent auto-prompt engine 210 is a multi-task prompt generator. That is, using the reverse inference framework 500 of FIG. 5, the intelligent auto-prompt engine 210 is trained in different application tasks to generate task specific contextualized prompts (the contextualized prompts 706*a-e*).

In one or more example embodiments, different application tasks are various network domain specific applications or application scenarios. Some non-limiting examples of network domain specific applications or scenarios include ticketing prioritization 702*a*, security resolution 702*b*, technical report briefing 702*c*, and network feature recommendation 702*e*. The ticketing prioritization 702*a* may be a task of a network connectivity related service. The security resolution 702*b* may be a task of a network security related service. The technical report briefing 702*c* and the network feature recommendation 702e may be tasks of a network management service such as the cloud portal 100 of FIG. 1.

Figure 5:
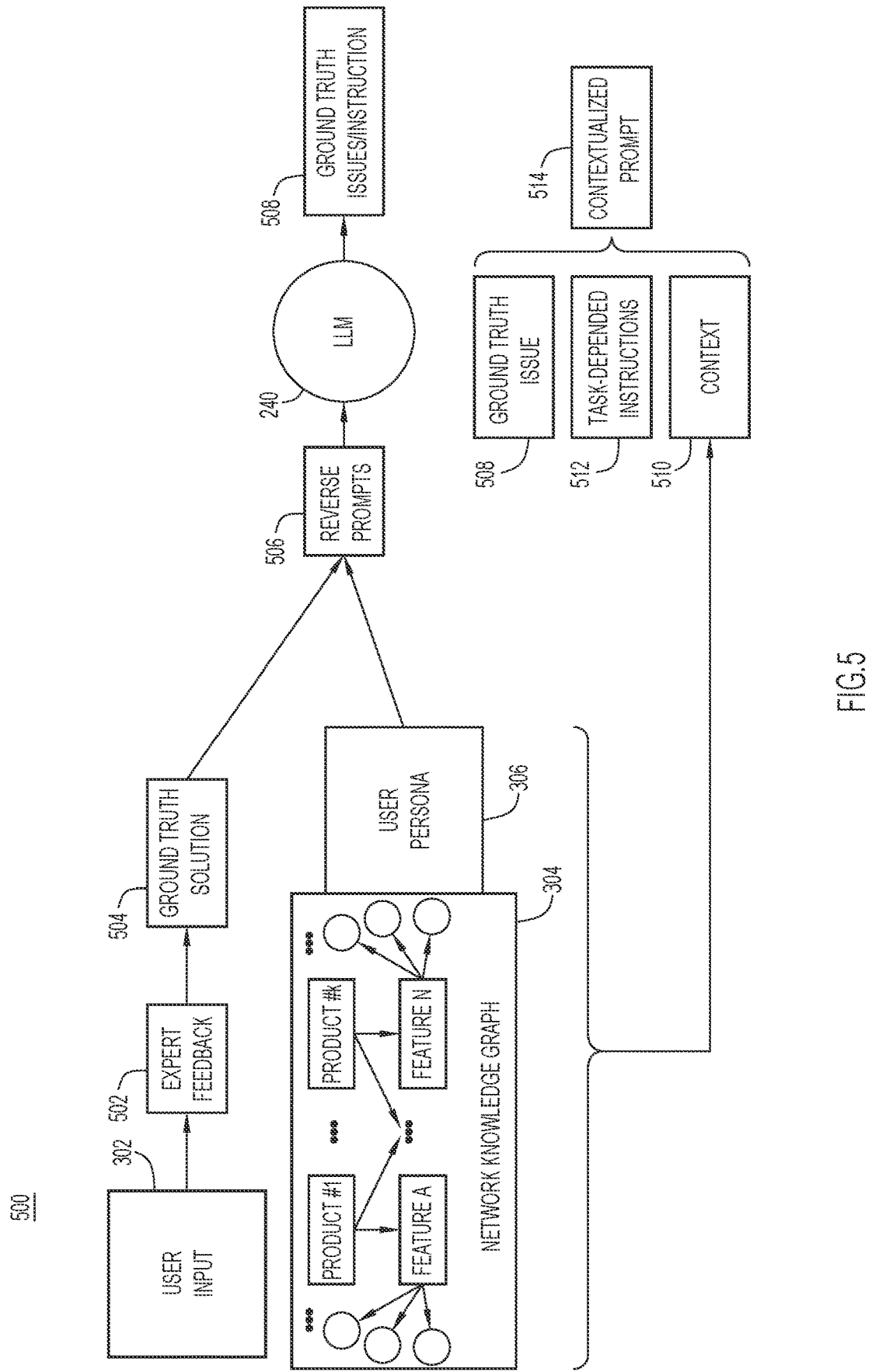
FIG. 5 is a diagram illustrating a reverse inference framework in which a large language model of the unified prompt-based network management system of FIG. 1 generates reverse inferences for an intelligent auto-prompt engine, according to an example embodiment.
Figure 6:
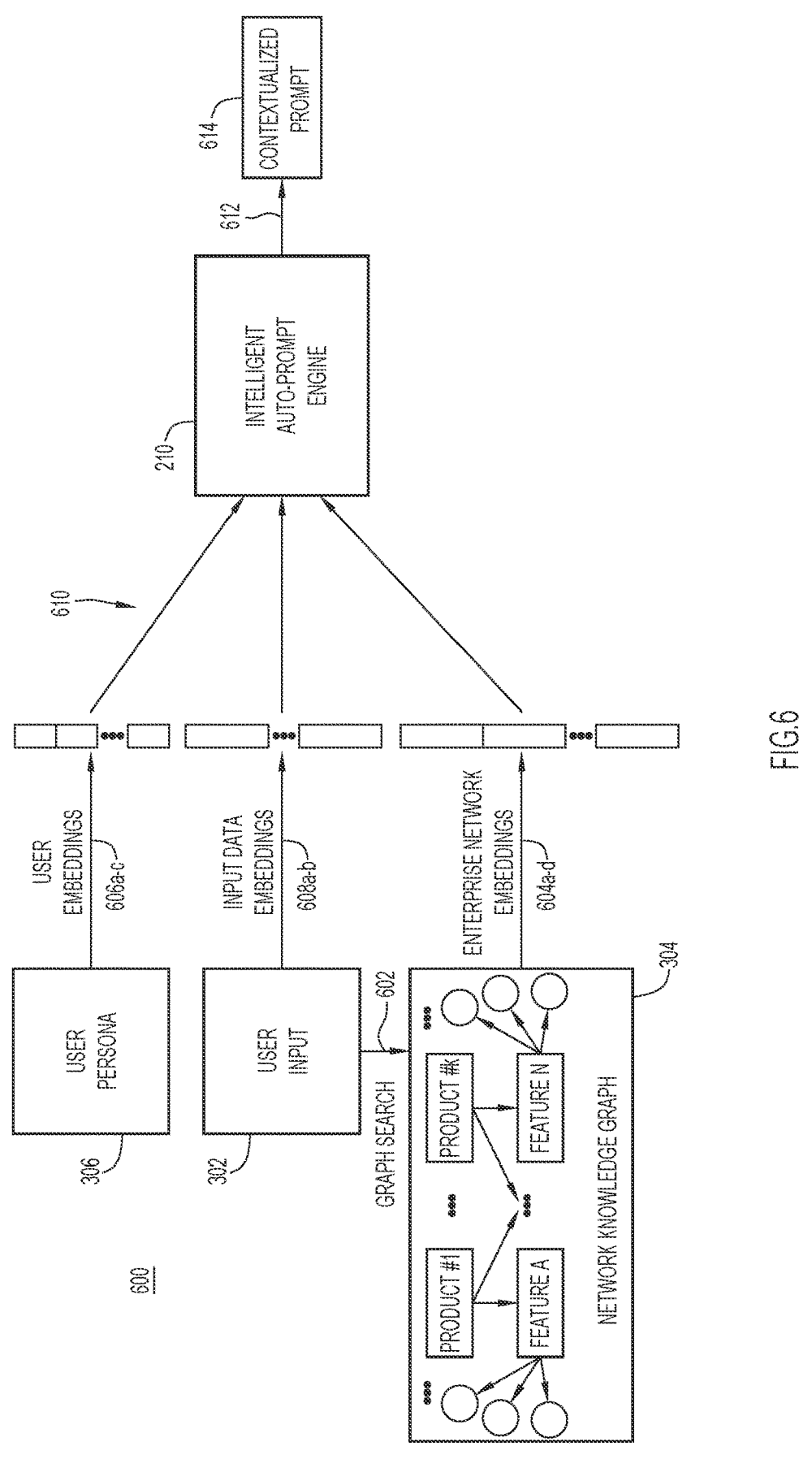
FIG. 6 is a diagram illustrating an environment in which an intelligent auto-prompt engine of the unified prompt-based network management system of FIG. 1 generates a contextualized prompt, according to an example embodiment.

Since the intelligent auto-prompt engine 210 is trained based on multiple network domain specific applications, the intelligent auto-prompt engine 210 generates different contextualized prompts 706a-e for different domain-specific application tasks/scenarios i.e., based on the network domain specific application or use case scenario. Specifically, during training, for each different task (tasks 702a-e), the reverse inference framework 500 of FIG. 5 is used to generate ground truth prompts. The generated ground truth prompts are paired with the user input 302, the network knowledge graph 304, and the user persona 306 to train the intelligent auto-prompt engine 210. During this training process, data across all different network domain specific applications is used. Since the LLM 240 is intrinsically a multi-task learner, the newly trained prompt engine automatically generates prompts satisfying different use case scenarios (different network domain specific applications).

In the environment 700, at 710, user input 302, the network knowledge graph 304, and the user persona 306 are input into each of the tasks 702a-e. At 712, different embeddings 704a-e are generated. These different embeddings 704a-e include the respective network domain specific application. For example, a first set of embeddings 704a is specific to the ticketing prioritization 702a, a second set of embeddings 704b is specific to the security resolution 702b, a third set of embeddings 704c is specific to the technical report briefing 702c, and a fourth set of embeddings 704e is specific to the network feature recommendation 702e. At 714, the intelligent auto-prompt engine 210 outputs the contextualized prompts 706a-e.

For example, the contextualized prompts 706a-e may include a ticketing specific contextualized prompt 706a of the network connectivity related service such as "given technical report xxx, brief on the advisories and merge into the knowledge base xxx." The ticketing specific contextualized prompt 706a is specific to the ticketing prioritization 702a. The ticketing specific contextualized prompt 706a is in an automatic ticketing system evaluation and resolution network domain and is input into the LLM 240 to automatically resolve the ticket issue.

In related art ticketing systems, a large amount of time and effort is spent to complete and solve network tickets. Some network tickets may repeat the same network problems and other tickets may be higher service requests. Yet some network tickets may include false network claims. As the network scale increases exponentially, it is cumbersome and time consuming for network operators to address these ticketed network issues. The unified prompt system 120 provides an end-to-end generative solutions i.e., to automatically resolve the ticketed network issues. By employing the intelligent auto-prompt engine 210 and the LLM 240, the ticketed issue (via the ticketing prioritization 702a) jointly with the generated context prompt (user input 302, the network knowledge graph 304, and the user persona 306) form the ticketing specific contextualized prompt 706a, which is fed into the LLM 240 to generate an accurate solution to directly speed up the processing e.g., actionable tasks to resolve the ticketed network issue or actionable tasks that filter out false network claims.

As another example, the contextualized prompts 706a-e may include a security resolution contextualized prompt 706b such as "based on network issue A and security advisory xxx, suggest an optimal solution with the latest network products and/or features". The security resolution contextualized prompt 706b may be generated based on the same ticketed issue (the user input 302) but in the context of the security resolution 702b of the network security related service. As such, the security resolution contextualized prompt 706b instructs the LLM 240 to provide actionable tasks to solve a security related vulnerability. The LLM 240 may thus output and/or configure various security patches for the enterprise network.

As yet another example, the contextualized prompts 706a-e may further include a reporting specific contextualized prompt 706c such as "store network issues A and security advisory xxx in knowledge base and generate a technical report" and a recommendation contextualized prompt 706e such as "current portfolio includes switch YY and router ZZ, recommend new network devices that include an audit feature". The reporting specific contextualized prompt 706c and the recommendation contextualized prompt 706e relate to tasks of the network management service (the cloud portal 100 of FIG. 1). The reporting specific contextualized prompt 706c and the recommendation contextualized prompt 706e may be generated based on the same ticketing issue (the user input 302) but in the context of the technical report briefing 702c and the network feature recommendation 702e, respectively. As such, the LLM 240 generates actionable tasks that are specific to the task at hand (the network domain application or use case scenario). The LLM 240 may thus output computer-readable instructions for storing information about the network issue A and the security advisory xxx in the knowledge base of the cloud portal 100 and for generating a new text file with a technical report regarding the issue, affected network devices in the enterprise network, features disabled, etc. in the event of technical report briefing 702c, and information about new network devices that include the audit feature and are compatible with the devices in the enterprise network along with computer readable configuration instructions for installing new network devices, etc. in the event of network feature recommendation 702e.

That is, enterprises typically spend a large amount of time to summarize and organize knowledge base. The management of the knowledge base continuously requires the enterprises to spend time collecting and gathering scattered information. This knowledge base maintenance is very inefficient, time consuming, and error prone. Using the reporting specific contextualized prompt 706c, the LLM 240 automatically populates the knowledge base with the needed information, saving time, and avoiding human errors. Similarly, enterprises spend time to determine which network features are needed and which devices include them. Using the recommendation contextualized prompt 706e, the LLM 240 automatically determines which devices have which features and how to configure these new devices and enable these features.

The techniques presented herein provide a reverse prompt generation to train a unified prompt engine. In addition, the unified prompt engine is a multi-task actor, which allows generation of different domain-dependent prompts for incorporation of specialized knowledge. Moreover, user persona and network asset information are also utilized to further contextualize the prompt. By using deep customization in the prompt generation, the unified prompt engine can generate specific tailored solutions in network automation.

The techniques presented herein generate network domain specific prompts that use user context, enterprise network context, and reverse inference(s). The techniques presented herein use the same LLM to train the unified prompt engine and to generate solutions using contextualized prompts. The unified prompt engine first utilizes user and domain expert knowledge plus the LLM to inversely train the auto-prompt generator. The trained unified prompt engine is used to facilitate the curation of the raw inputs. The curated inputs in a form of contextualized prompts allow for more accurate solution generation compared with the raw inputs.

FIG. 8 is a flowchart illustrating a computer-implemented method 800 of providing the contextualized prompt to the artificial intelligence model for generating a tailored response to the input data, according to an example embodiment. The computer-implemented method 800 may be performed by a computing device such as a server or a group of servers that execute the of FIGS. 1-7.

The computer-implemented method 800 involves, at 802, obtaining input data related to a configuration or an operation of one or more assets in an enterprise network.

The computer-implemented method 800 further involves at 804, generating a contextualized prompt based on the input data, network knowledge information of the enterprise network, and at least one reverse inference generated using an artificial intelligence model.

The computer-implemented method 800 further involves at 806, providing the contextualized prompt to the artificial intelligence model for generating a tailored response to the input data. The tailored response includes a set of actionable tasks to be performed with respect to the one or more assets of the enterprise network.

According to one or more example embodiments, the input data may be a user input. The method 800 may further include obtaining the network knowledge information, which includes a topology of the enterprise network and data related to a plurality of network features of a plurality of assets in the enterprise network. The method 800 may further include generating at least one enterprise network embedding based on the network knowledge information. The contextualized prompt may be generated by processing the input data based on the at least one enterprise network embedding.

In one instance, the input data may be user input and the network knowledge information may include a network knowledge graph.

In one form, the method 800 may include extracting a set of nodes from a plurality of nodes of the network knowledge graph based on the input data and generating a network knowledge vector based on the set of nodes. The contextualized prompt may be generated by processing the input data based on the network knowledge vector.

According to one or more example embodiments, the input data may include at least one query or instruction from a user. The operation 804 of generating the contextualized prompt may include generating at least one user embedding based on a persona of the user which includes one or more of a user profile and a user role within the enterprise network and generating the contextualized prompt by processing the input data based on the at least one user embedding.

In another form, the method 800 may further include changing, by a computing device, the configuration of one or more affected network devices in the enterprise network by performing the set of actionable tasks.

In another instance, in the method 800, changing the configuration of the one or more affected network devices may include establishing, by the computing device, a connection with each of the one or more affected network devices using an application programming interface and reconfiguring, by the computing device, a hardware or a firmware on a respective network device.

According to one or more example embodiments, the method 800 may further include training the artificial intelligence model during an inference phase to generate the at least one reverse inference.

In one instance, in the method 800, training of the artificial intelligence model during the inference phase may include obtaining a prompt including context information about the enterprise network and user input and generating a solution including at least one actionable task by processing the prompt using the artificial intelligence model. The training of the artificial intelligence model may further include generating a new prompt including the context information and the solution and generating the at least one reverse inference by processing the new prompt using the artificial intelligence model.

In one form, the method 800 may further involve training the artificial intelligence model based on a plurality of network domain specific applications. In the method 800, the operation 804 of generating the contextualized prompt may further be based on a selected one of the plurality of network domain specific applications.

According to one or more example embodiments, the plurality of network domain specific applications may involve a network connectivity related service, a network security related service, and a network management service. Additionally, the artificial intelligence model may be a large language machine model.

Figure 9:
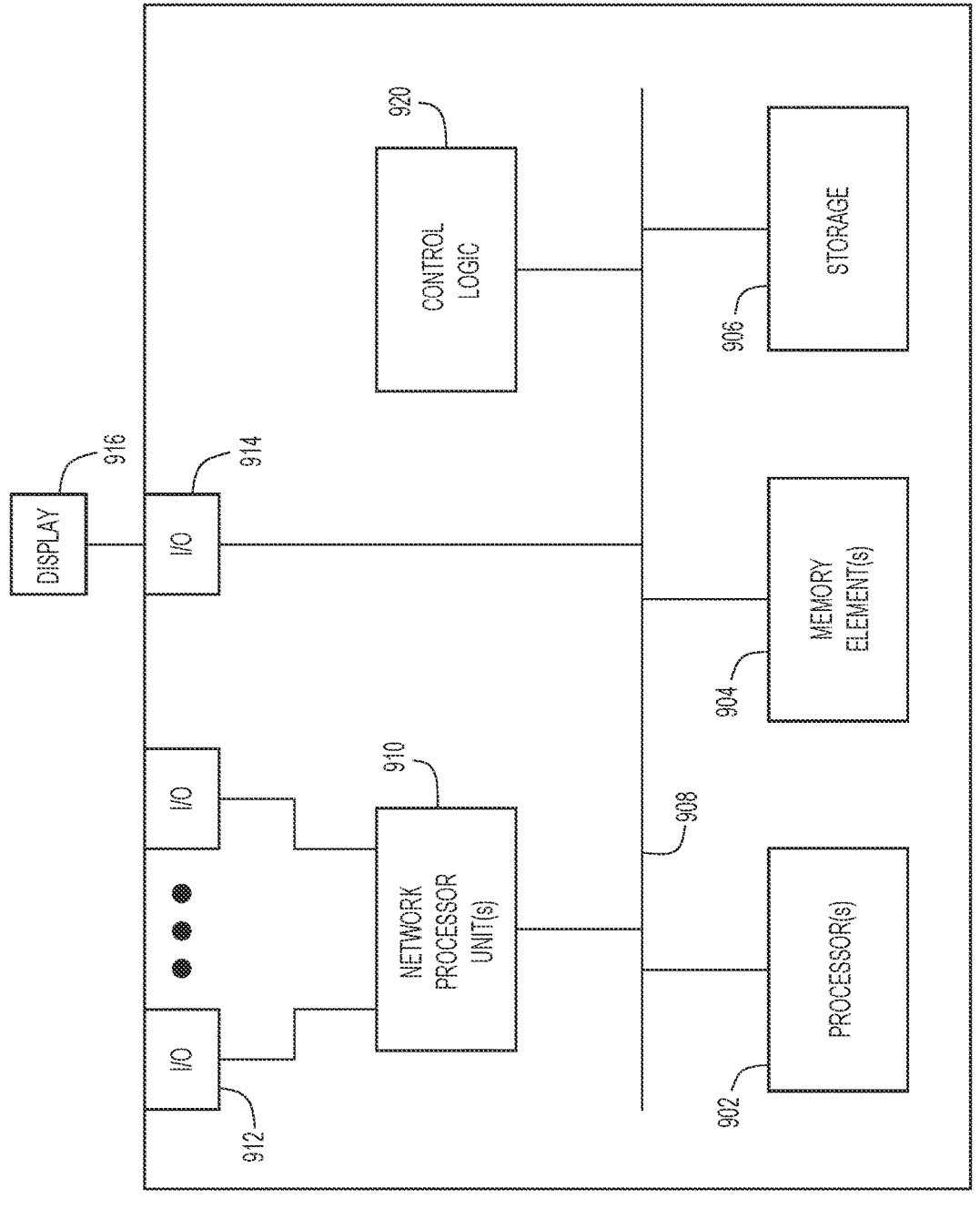
FIG. 9 is a hardware block diagram of a computing device that may perform functions associated with any combination of operations in connection with the techniques depicted and described in FIGS. 1-8, according to various example embodiments.

FIG. 9 is a hardware block diagram of a computing device 900 that may perform functions associated with any combination of operations in connection with the techniques depicted in FIGS. 1-8, according to various example embodiments, including, but not limited to, operations of the computing device or one or more servers that execute the cloud portal 100 and/or the unified prompt system 120. Further, the computing device 900 may be representative of an apparatus such as one of the network devices, network/computing equipment, or hardware asset of an enterprise. It should be appreciated that FIG. 9 provides only an illustration of one example embodiment and does not imply any limitations with respect to the environments in which different example embodiments may be implemented. Many modifications to the depicted environment may be made.

In at least one embodiment, computing device 900 may include one or more processor(s) 902, one or more memory element(s) 904, storage 906, a bus 908, one or more network processor unit(s) 910 interconnected with one or more network input/output (I/O) interface(s) 912, one or more I/O interface(s) 914, and control logic 920. In various embodiments, instructions associated with logic for computing device 900 can overlap in any manner and are not limited to the specific allocation of instructions and/or operations described herein.

In at least one embodiment, processor(s) 902 is/are at least one hardware processor configured to execute various tasks, operations and/or functions for computing device 900 as described herein according to software and/or instructions configured for computing device 900. Processor(s) 902 (e.g., a hardware processor) can execute any type of instructions associated with data to achieve the operations detailed herein. In one example, processor(s) 902 can transform an element or an article (e.g., data, information) from one state or thing to another state or thing. Any of potential processing elements, microprocessors, digital signal processor, baseband signal processor, modem, PHY, controllers, systems, managers, logic, and/or machines described herein can be construed as being encompassed within the broad term 'processor'.

In at least one embodiment, one or more memory element(s) 904 and/or storage 906 is/are configured to store data, information, software, and/or instructions associated with computing device 900, and/or logic configured for memory element(s) 904 and/or storage 906. For example, any logic described herein (e.g., control logic 920) can, in various embodiments, be stored for computing device 900 using any combination of memory element(s) 904 and/or storage 906. Note that in some embodiments, storage 906 can be consolidated with one or more memory elements 904 (or vice versa), or can overlap/exist in any other suitable manner.

In at least one embodiment, bus 908 can be configured as an interface that enables one or more elements of computing device 900 to communicate in order to exchange information and/or data. Bus 908 can be implemented with any architecture designed for passing control, data and/or information between processors, memory elements/storage, peripheral devices, and/or any other hardware and/or software components that may be configured for computing device 900. In at least one embodiment, bus 908 may be implemented as a fast kernel-hosted interconnect, potentially using shared memory between processes (e.g., logic), which can enable efficient communication paths between the processes.

In various example embodiments, network processor unit(s) 910 may enable communication between computing device 900 and other systems, entities, etc., via network I/O interface(s) 912 to facilitate operations discussed for various embodiments described herein. In various embodiments, network processor unit(s) 910 can be configured as a combination of hardware and/or software, such as one or more Ethernet driver(s) and/or controller(s) or interface cards, Fibre Channel (e.g., optical) driver(s) and/or controller(s), and/or other similar network interface driver(s) and/or controller(s) now known or hereafter developed to enable communications between computing device 900 and other systems, entities, etc. to facilitate operations for various embodiments described herein. In various example embodiments, network I/O interface(s) 912 can be configured as one or more Ethernet port(s), Fibre Channel ports, and/or any other I/O port(s) now known or hereafter developed. Thus, the network processor unit(s) 910 and/or network I/O interface(s) 912 may include suitable interfaces for receiving, transmitting, and/or otherwise communicating data and/or information in a network environment.

I/O interface(s) 914 allow for input and output of data and/or information with other entities that may be connected to computing device 900. For example, I/O interface(s) 914 may provide a connection to external devices such as a keyboard, keypad, a touch screen, and/or any other suitable input device now known or hereafter developed. In some instances, external devices can also include portable computer readable (non-transitory) storage media such as database systems, thumb drives, portable optical or magnetic disks, and memory cards. In still some instances, external devices can be a mechanism to display data to a user, such as, for example, a display 916 such as a computer monitor, a display screen, or the like.

In various example embodiments, control logic 920 can include instructions that, when executed, cause processor(s) 902 to perform operations, which can include, but not be limited to, providing overall control operations of computing device; interacting with other entities, systems, etc. described herein; maintaining and/or interacting with stored data, information, parameters, etc. (e.g., memory element(s), storage, data structures, databases, tables, etc.); combinations thereof; and/or the like to facilitate various operations for embodiments described herein.

In another example embodiment, an apparatus is provided. The apparatus includes a memory, a network interface configured to enable network communications, and a processor. The processor of the apparatus is configured to perform a method including obtaining input data related to a configuration or an operation of one or more assets in an enterprise network and generating a contextualized prompt based on the input data, network knowledge information of the enterprise network, and at least one reverse inference generated using an artificial intelligence model. The method further includes providing the contextualized prompt to the artificial intelligence model for generating a tailored response to the input data. The tailored response includes a set of actionable tasks to be performed with respect to the one or more assets of the enterprise network In yet another example embodiment, one or more non-transitory computer readable storage media encoded with instructions are provided. When the media is executed by a processor, the instructions cause the processor to execute a method that includes obtaining input data related to a configuration or an operation of one or more assets in an enterprise network and generating a contextualized prompt based on the input data, network knowledge information of the enterprise network, and at least one reverse inference generated using an artificial intelligence model. The method further includes providing the contextualized prompt to the artificial intelligence model for generating a tailored response to the input data. The tailored response includes a set of actionable tasks to be performed with respect to the one or more assets of the enterprise network.

In yet another example embodiment, a system is provided that includes the devices or apparatuses and operations explained above with reference to FIGS. 1-9.

The programs described herein (e.g., control logic 920) may be identified based upon the application(s) for which they are implemented in a specific embodiment. However, it should be appreciated that any particular program nomenclature herein is used merely for convenience, and thus the embodiments herein should not be limited to use(s) solely described in any specific application(s) identified and/or implied by such nomenclature.

In various embodiments, entities as described herein may store data/information in any suitable volatile and/or non-volatile memory item (e.g., magnetic hard disk drive, solid state hard drive, semiconductor storage device, random access memory (RAM), read only memory (ROM), erasable programmable read only memory (EPROM), application specific integrated circuit (ASIC), etc.), software, logic (fixed logic, hardware logic, programmable logic, analog logic, digital logic), hardware, and/or in any other suitable component, device, element, and/or object as may be appropriate. Any of the memory items discussed herein should be construed as being encompassed within the broad term 'memory element'. Data/information being tracked and/or sent to one or more entities as discussed herein could be provided in any database, table, register, list, cache, storage, and/or storage structure: all of which can be referenced at any suitable timeframe. Any such storage options may also be included within the broad term 'memory element' as used herein.

Note that in certain example implementations, operations as set forth herein may be implemented by logic encoded in one or more tangible media that is capable of storing instructions and/or digital information and may be inclusive of non-transitory tangible media and/or non-transitory computer readable storage media (e.g., embedded logic provided in: an ASIC, digital signal processing (DSP) instructions, software [potentially inclusive of object code and source code], etc.) for execution by one or more processor(s), and/or other similar machine, etc. Generally, the storage 906 and/or memory elements(s) 904 can store data, software, code, instructions (e.g., processor instructions), logic, parameters, combinations thereof, and/or the like used for operations described herein. This includes the storage 906 and/or memory elements(s) 904 being able to store data, software, code, instructions (e.g., processor instructions), logic, parameters, combinations thereof, or the like that are executed to carry out operations in accordance with teachings of the present disclosure.

In some instances, software of the present embodiments may be available via a non-transitory computer useable medium (e.g., magnetic or optical mediums, magneto-optic mediums, CD-ROM, DVD, memory devices, etc.) of a stationary or portable program product apparatus, downloadable file(s), file wrapper(s), object(s), package(s), container(s), and/or the like. In some instances, non-transitory computer readable storage media may also be removable. For example, a removable hard drive may be used for memory/storage in some implementations. Other examples may include optical and magnetic disks, thumb drives, and smart cards that can be inserted and/or otherwise connected to a computing device for transfer onto another computer readable storage medium.

Embodiments described herein may include one or more networks, which can represent a series of points and/or network elements of interconnected communication paths for receiving and/or transmitting messages (e.g., packets of information) that propagate through the one or more networks. These network elements offer communicative interfaces that facilitate communications between the network elements. A network can include any number of hardware and/or software elements coupled to (and in communication with) each other through a communication medium. Such networks can include, but are not limited to, any local area network (LAN), virtual LAN (VLAN), wide area network (WAN) (e.g., the Internet), software defined WAN (SD-WAN), wireless local area (WLA) access network, wireless wide area (WWA) access network, metropolitan area network (MAN), Intranet, Extranet, virtual private network (VPN), Low Power Network (LPN), Low Power Wide Area Network (LPWAN), Machine to Machine (M2M) network, Internet of Things (IoT) network, Ethernet network/switching system, any other appropriate architecture and/or system that facilitates communications in a network environment, and/or any suitable combination thereof.

Networks through which communications propagate can use any suitable technologies for communications including wireless communications (e.g., 4G/5G/nG, IEEE 802.11 (e.g., Wi-Fi®/Wi-Fi6®), IEEE 802.16 (e.g., Worldwide Interoperability for Microwave Access (WiMAX)), Radio-Frequency Identification (RFID), Near Field Communication (NFC), Bluetooth™, mm.wave, Ultra-Wideband (UWB), etc.), and/or wired communications (e.g., T1 lines, T3 lines, digital subscriber lines (DSL), Ethernet, Fibre Channel, etc.). Generally, any suitable means of communications may be used such as electric, sound, light, infrared, and/or radio to facilitate communications through one or more networks in accordance with embodiments herein. Communications, interactions, operations, etc. as discussed for various embodiments described herein may be performed among entities that may directly or indirectly connected utilizing any algorithms, communication protocols, interfaces, etc. (proprietary and/or non-proprietary) that allow for the exchange of data and/or information.

Communications in a network environment can be referred to herein as 'messages', 'messaging', 'signaling', 'data', 'content', 'objects', 'requests', 'queries', 'responses', 'replies', etc. which may be inclusive of packets. As referred to herein, the terms may be used in a generic sense to include packets, frames, segments, datagrams, and/or any other generic units that may be used to transmit communications in a network environment. Generally, the terms reference to a formatted unit of data that can contain control or routing information (e.g., source and destination address, source and destination port, etc.) and data, which is also sometimes referred to as a 'payload', 'data payload', and variations thereof. In some embodiments, control or routing information, management information, or the like can be included in packet fields, such as within header(s) and/or trailer(s) of packets. Internet Protocol (IP) addresses discussed herein and in the claims can include any IP version 4 (IPv4) and/or IP version 6 (IPv6) addresses.

To the extent that embodiments presented herein relate to the storage of data, the embodiments may employ any number of any conventional or other databases, data stores or storage structures (e.g., files, databases, data structures, data, or other repositories, etc.) to store information.

Note that in this Specification, references to various features (e.g., elements, structures, nodes, modules, components, engines, logic, steps, operations, functions, characteristics, etc.) included in 'one embodiment', 'example embodiment', 'an embodiment', 'another embodiment', 'certain embodiments', 'some embodiments', 'various embodiments', 'other embodiments', 'alternative embodiment', and the like are intended to mean that any such features are included in one or more embodiments of the present disclosure, but may or may not necessarily be combined in the same embodiments. Note also that a module, engine, client, controller, function, logic or the like as used herein in this Specification, can be inclusive of an executable file comprising instructions that can be understood and processed on a server, computer, processor, machine, compute node, combinations thereof, or the like and may further include library modules loaded during execution, object files, system files, hardware logic, software logic, or any other executable modules.

It is also noted that the operations and steps described with reference to the preceding figures illustrate only some of the possible scenarios that may be executed by one or more entities discussed herein. Some of these operations may be deleted or removed where appropriate, or these steps may be modified or changed considerably without departing from the scope of the presented concepts. In addition, the timing and sequence of these operations may be altered considerably and still achieve the results taught in this disclosure. The preceding operational flows have been offered for purposes of example and discussion. Substantial flexibility is provided by the embodiments in that any suitable arrangements, chronologies, configurations, and timing mechanisms may be provided without departing from the teachings of the discussed concepts.

As used herein, unless expressly stated to the contrary, use of the phrase 'at least one of', 'one or more of', 'and/or', variations thereof, or the like are open-ended expressions that are both conjunctive and disjunctive in operation for any and all possible combination of the associated listed items. For example, each of the expressions 'at least one of X, Y and Z', 'at least one of X, Y or Z', 'one or more of X, Y and Z', 'one or more of X, Y or Z' and 'X, Y and/or Z' can mean any of the following: 1) X, but not Y and not Z; 2) Y, but not X and not Z; 3) Z, but not X and not Y; 4) X and Y, but not Z; 5) X and Z, but not Y; 6) Y and Z, but not X; or 7) X, Y, and Z.

Additionally, unless expressly stated to the contrary, the terms 'first', 'second', 'third', etc., are intended to distinguish the particular nouns they modify (e.g., element, condition, node, module, activity, operation, etc.). Unless expressly stated to the contrary, the use of these terms is not intended to indicate any type of order, rank, importance, temporal sequence, or hierarchy of the modified noun. For example, 'first X' and 'second X' are intended to designate two 'X' elements that are not necessarily limited by any order, rank, importance, temporal sequence, or hierarchy of the two elements. Further as referred to herein, 'at least one of' and 'one or more of' can be represented using the '(s)' nomenclature (e.g., one or more element(s)).

Each example embodiment disclosed herein has been included to present one or more different features. However, all disclosed example embodiments are designed to work together as part of a single larger system or method. This disclosure explicitly envisions compound embodiments that combine multiple previously discussed features in different example embodiments into a single system or method.

One or more advantages described herein are not meant to suggest that any one of the embodiments described herein necessarily provides all of the described advantages or that all the embodiments of the present disclosure necessarily provide any one of the described advantages. Numerous other changes, substitutions, variations, alterations, and/or modifications may be ascertained to one skilled in the art and it is intended that the present disclosure encompass all such changes, substitutions, variations, alterations, and/or modifications as falling within the scope of the appended claims.

What is claimed is:

1. A computer-implemented method comprising:
obtaining input data related to a configuration or an operation of one or more assets in an enterprise network;
generating a contextualized prompt based on the input data, network knowledge information of the enterprise network, and at least one reverse inference generated using an artificial intelligence model;
providing the contextualized prompt to the artificial intelligence model for generating a tailored response to the input data, wherein the tailored response includes a set of actionable tasks to be performed with respect to the one or more assets of the enterprise network; and
changing, by a computing device, the configuration of at least one affected network device of the one or more assets in the enterprise network by performing the set of actionable tasks.

2. The computer-implemented method of claim 1, wherein the input data is a user input and further comprising:
obtaining the network knowledge information, which includes a topology of the enterprise network and data related to a plurality of network features of a plurality of assets in the enterprise network; and
generating at least one enterprise network embedding based on the network knowledge information, wherein the contextualized prompt is generated by processing the input data based on the at least one enterprise network embedding.

3. The computer-implemented method of claim 1, wherein the input data is a user input and the network knowledge information include a network knowledge graph.

4. The computer-implemented method of claim 3, further comprising:
extracting a set of nodes from a plurality of nodes of the network knowledge graph based on the input data; and
generating a network knowledge vector based on the set of nodes, wherein the contextualized prompt is generated by processing the input data based on the network knowledge vector.

5. The computer-implemented method of claim 1, wherein the input data includes at least one query or instruction from a user, and generating the contextualized prompt further includes:
generating at least one user embedding based on a persona of the user which includes one or more of a user profile and a user role within the enterprise network; and
generating the contextualized prompt by processing the input data based on the at least one user embedding.

6. The computer-implemented method of claim 1, wherein changing the configuration of the at least one affected network device includes:
establishing, by the computing device, a connection with each of the at least one affected network device using an application programming interface; and
reconfiguring, by the computing device, a hardware or a firmware on a respective network device.

7. The computer-implemented method of claim 1, further comprising training the artificial intelligence model during an inference phase to generate the at least one reverse inference.

8. A computer-implemented method comprising:
obtaining input data related to a configuration or an operation of one or more assets in an enterprise network;
generating a contextualized prompt based on the input data, network knowledge information of the enterprise network, and at least one reverse inference generated using an artificial intelligence model;
providing the contextualized prompt to the artificial intelligence model for generating a tailored response to the input data, wherein the tailored response includes a set of actionable tasks to be performed with respect to the one or more assets of the enterprise network; and
training the artificial intelligence model during an inference phase by:
obtaining a prompt including context information about the enterprise network and user input,
generating a solution including at least one actionable task by processing the prompt using the artificial intelligence model,
generating a new prompt including the context information and the solution, and
generating the at least one reverse inference by processing the new prompt using the artificial intelligence model.

9. The computer-implemented method of claim 8, further comprising:
training the artificial intelligence model based on a plurality of network domain specific applications, wherein generating the contextualized prompt is further based on a selected one of the plurality of network domain specific applications.

10. The computer-implemented method of claim 9, wherein the plurality of network domain specific applications include a network connectivity related service, a network security related service, and a network management service and wherein the artificial intelligence model is a large language machine model.

11. The computer-implemented method of claim 8, wherein the input data includes at least one query or instruction from a user, and wherein generating the contextualized prompt includes:

generating at least one user embedding based on a persona of the user which includes one or more of a user profile and a user role within the enterprise network; and generating the contextualized prompt by processing the input data based on the at least one user embedding.

12. An apparatus comprising:

a memory;

a network interface configured to enable network communications; and a processor, wherein the processor is configured to perform a method comprising:

obtaining input data related to a configuration or an operation of one or more assets in an enterprise network;

generating a contextualized prompt based on the input data, network knowledge information of the enterprise network, and at least one reverse inference generated using an artificial intelligence model, wherein the contextualized prompt is generated by:

generating input embedding based on the input data, generating at least one network embedding based on the network knowledge information in a network knowledge graph and the input data, and generating, by an artificial intelligence prompt engine, the contextualized prompt based on the input embedding, the at least one network embedding, and the at least one reverse inference;

generating, by the artificial intelligence model, a tailored response to the input data based on the contextualized prompt, wherein the tailored response includes a set of actionable tasks to be performed with respect to the one or more assets of the enterprise network; and providing the tailored response for configuring the one or more assets in the enterprise network.

13. The apparatus of claim 12, wherein the input data is a user input and the processor is further configured to perform:

obtaining the network knowledge information, which includes a topology of the enterprise network and data related to a plurality of network features of a plurality of assets in the enterprise network; and generating the at least one network embedding based on the network knowledge information.

14. The apparatus of claim 12, wherein the input data is a user input and the network knowledge information include the network knowledge graph.

15. The apparatus of claim 14, wherein the processor is further configured to perform:

extracting a set of nodes from a plurality of nodes of the network knowledge graph based on the input data; and generating a network knowledge vector based on the set of nodes, wherein the contextualized prompt is generated by processing the input data based on the network knowledge vector.

16. The apparatus of claim 12, wherein the input data includes at least one query or instruction from a user, and wherein the processor is configured to generate the contextualized prompt further by:

generating at least one user embedding based on a persona of the user which includes one or more of a user profile and a user role within the enterprise network; and generating the contextualized prompt by processing the input data based on the at least one user embedding.

17. The apparatus of claim 12, wherein the processor is further configured to perform:

changing, by a computing device, the configuration of one or more affected network devices in the enterprise network by performing the set of actionable tasks.

18. The apparatus of claim 12, further comprising:

generating, by the artificial intelligence model, the at least one reverse inference based on a known set of actionable tasks.

19. The apparatus of claim 12, wherein the at least one reverse inference is generated by:

obtaining a prompt including context information about the enterprise network and user input;

generating a solution including at least one actionable task by processing the prompt using the artificial intelligence model;

generating a new prompt including the context information and the solution; and generating the at least one reverse inference by processing the new prompt using the artificial intelligence model.

20. The apparatus of claim 12, wherein generating the contextualized prompt further includes:

adopting, by the artificial intelligence prompt engine, a prompt to a specific network domain based on a user persona, to generate the contextualized prompt.

\* \* \* \* \*